United States Patent
Takeda et al.

(10) Patent No.: US 10,057,023 B2
(45) Date of Patent: Aug. 21, 2018

(54) USER TERMINAL, RADIO BASE STATION AND RADIO COMMUNICATION METHOD

(71) Applicant: NTT DOCOMO, INC., Tokyo (JP)

(72) Inventors: Kazuki Takeda, Tokyo (JP); Shimpei Yasukawa, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/889,378

(22) PCT Filed: Apr. 14, 2014

(86) PCT No.: PCT/JP2014/060604
§ 371 (c)(1),
(2) Date: Nov. 5, 2015

(87) PCT Pub. No.: WO2014/181644
PCT Pub. Date: Nov. 13, 2014

(65) Prior Publication Data
US 2016/0127090 A1   May 5, 2016

(30) Foreign Application Priority Data

May 9, 2013 (JP) ................................ 2013-099280

(51) Int. Cl.
*H04L 5/00* (2006.01)
*H04W 72/04* (2009.01)
(Continued)

(52) U.S. Cl.
CPC .............. *H04L 5/0035* (2013.01); *H04L 1/18* (2013.01); *H04L 5/00* (2013.01); *H04W 16/32* (2013.01);
(Continued)

(58) Field of Classification Search
CPC .......... H04W 72/04; H04W 16/32; H04L 5/00
See application file for complete search history.

(56) References Cited

U.S. PATENT DOCUMENTS

| 2010/0111024 A1* | 5/2010 | Fan ........................ H04L 1/1854 370/329 |
| 2010/0322165 A1* | 12/2010 | Yoo ........................ H04L 1/1812 370/329 |

(Continued)

FOREIGN PATENT DOCUMENTS

| EP | 2385736 A1 | 11/2011 |
| EP | 2579491 A2 | 4/2013 |

(Continued)

OTHER PUBLICATIONS

International Search Report issued in PCT/JP2014/060604 dated Jul. 1, 2014 (4 pages).

(Continued)

*Primary Examiner* — Xavier Szewai Wong
(74) *Attorney, Agent, or Firm* — Osha Liang LLP

(57) ABSTRACT

The present invention is designed to enable adequate feedback on the uplink even when CA and CoMP are employed between a plurality of radio base stations (inter-eNB CoMP/CA). A receiving section that receives downlink signals from a first radio base station that forms a first cell and a second radio base station that forms a second cell, a generating section that generates a feedback signal in response to the downlink signal from each radio base station, and a control section that assigns the feedback signal in response to the downlink signal from the first radio base station to an uplink control channel and/or an uplink shared channel on the first cell depending on whether or not there is a UL grant, and assigns the feedback signal in response to the downlink signal from the second radio base station to the uplink shared (Continued)

channel on the first cell or the second cell regardless of whether or not there is the UL grant, are provided in a user terminal.

11 Claims, 19 Drawing Sheets

(51) Int. Cl.
  *H04L 1/18* (2006.01)
  *H04W 16/32* (2009.01)
(52) U.S. Cl.
  CPC ....... *H04W 72/04* (2013.01); *H04W 72/0413* (2013.01); *H04W 72/042* (2013.01)

(56) References Cited

U.S. PATENT DOCUMENTS

| | | | | |
|---|---|---|---|---|
| 2011/0305161 | A1 | 12/2011 | Ekpenyong et al. | |
| 2012/0243497 | A1* | 9/2012 | Chung | H04L 5/0055 370/329 |
| 2013/0039231 | A1* | 2/2013 | Wang | H04W 72/10 370/280 |
| 2013/0242923 | A1* | 9/2013 | Yang | H04L 1/1825 370/329 |
| 2013/0250910 | A1* | 9/2013 | Liao | H04W 36/08 370/331 |
| 2013/0272258 | A1* | 10/2013 | Lee | H04B 7/0413 370/329 |
| 2014/0169343 | A1* | 6/2014 | Skov | H04L 5/0007 370/336 |
| 2014/0321406 | A1* | 10/2014 | Marinier | H04B 7/024 370/329 |
| 2015/0103703 | A1* | 4/2015 | Zeng | H04W 72/14 370/280 |
| 2015/0110017 | A1* | 4/2015 | Park | H04L 1/1861 370/329 |
| 2015/0195822 | A1* | 7/2015 | Han | H04W 52/0258 370/329 |
| 2015/0351116 | A1* | 12/2015 | Shoshan | H04B 7/15542 370/330 |
| 2016/0286558 | A1* | 9/2016 | Chae | H04L 5/0055 |

FOREIGN PATENT DOCUMENTS

| | | |
|---|---|---|
| JP | 2010279009 A | 12/2010 |
| JP | 2012-151893 A | 8/2012 |
| JP | 2012235353 A | 11/2012 |
| WO | 2013028012 A2 | 2/2013 |

OTHER PUBLICATIONS

3GPP TR 36.814 V9.0.0; "3rd Generation Partnership Project; Technical Specification Group Radio Access Network; Evolved Universal Terrestrial Radio Access (E-UTRA); Further advancements for E-UTRA physical layer aspects (Release 9)"; Mar. 2010 (107 pages).
Extended European Search Report dated Nov. 18, 2016, in corresponding European Patent Application No. 14794530.7 (11 pages).
3GPP TSG RAN WG1 Meeting #68bis, "Periodic CSI issues on uplink control signalling enhancement", R1-121343, Mar. 26-30, 2012, Jeju, Korea (7 pages).
Office Action issued in the counterpart Japanese Patent Application No. 2013-099280, dated Apr. 18, 2017 (15 pages).
Australian Search Report issued in corresponding Australian Application No. 2014263736, dated Mar. 31, 2017 (3 pages).
Office Action issued in the counterpart European Patent Application No. 14794530.7, dated Mar. 15, 2018 (8 pages).

\* cited by examiner

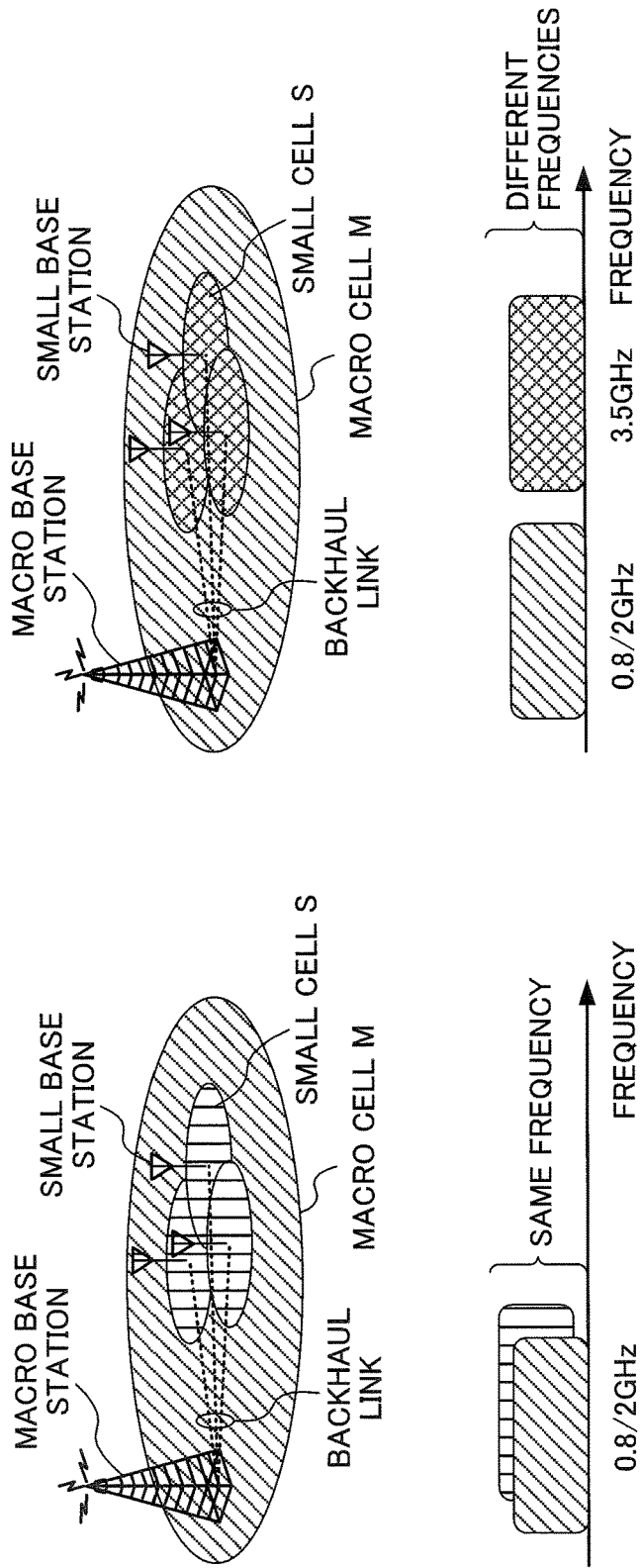

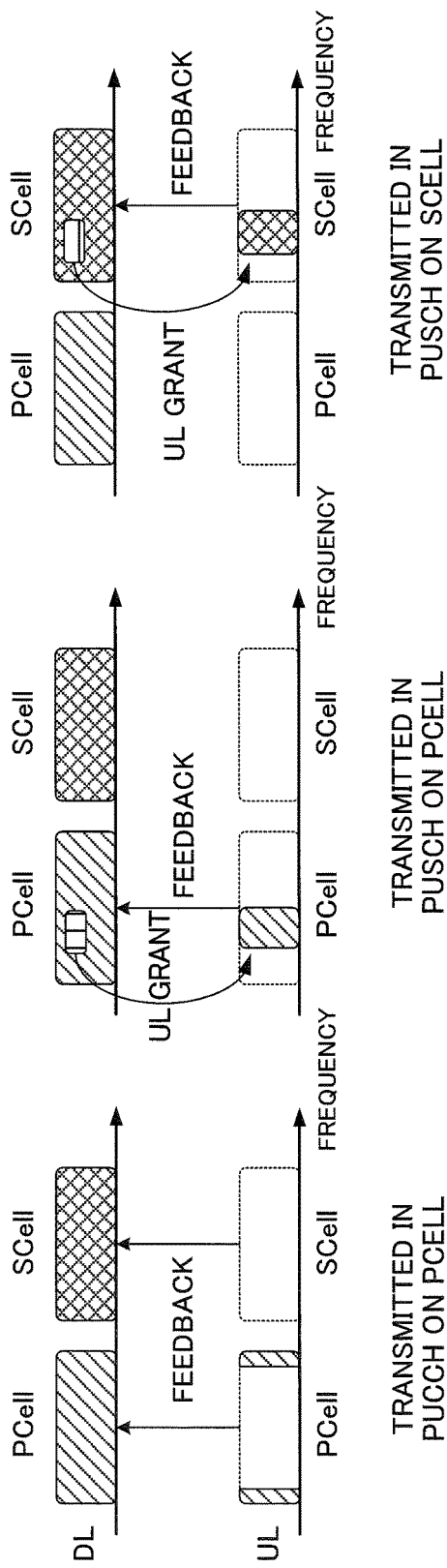

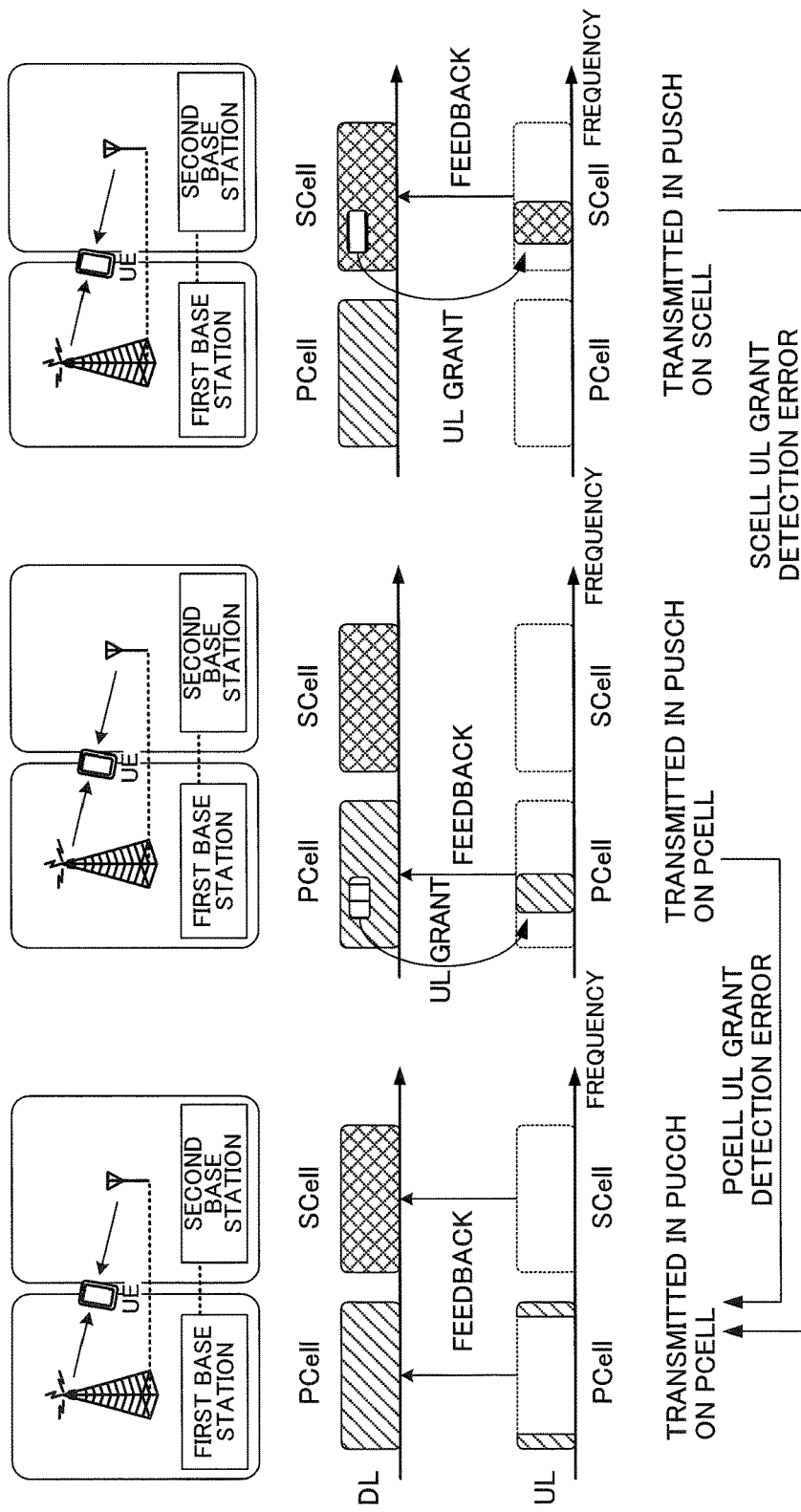

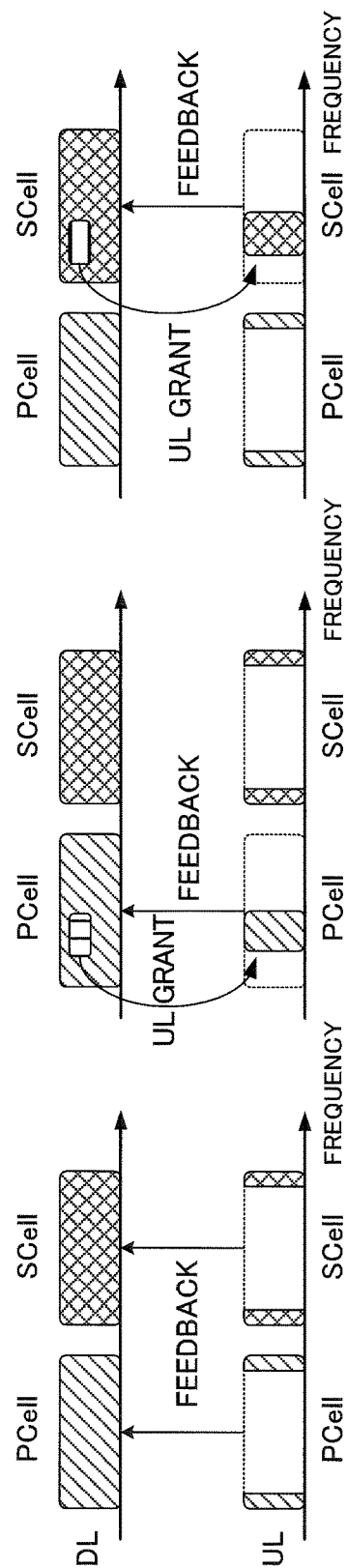

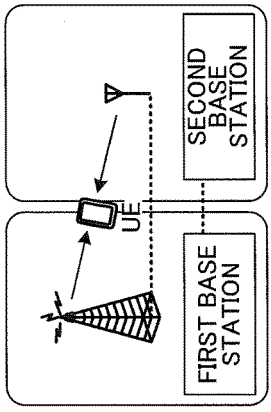
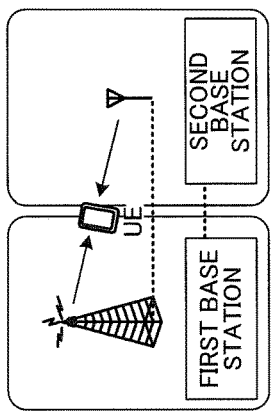
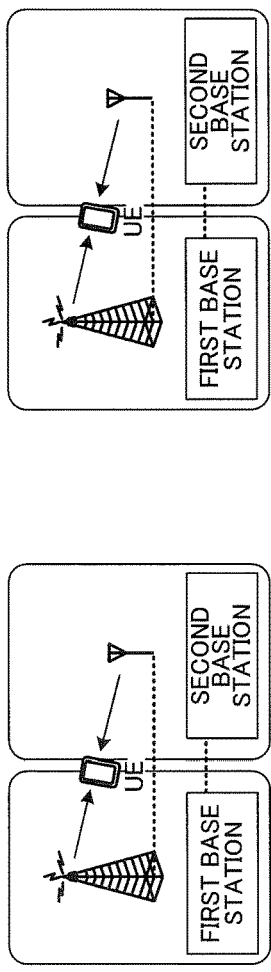
FIG.8A  FIG.8B  FIG.8C
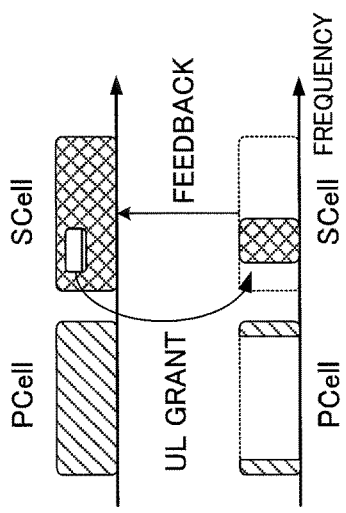
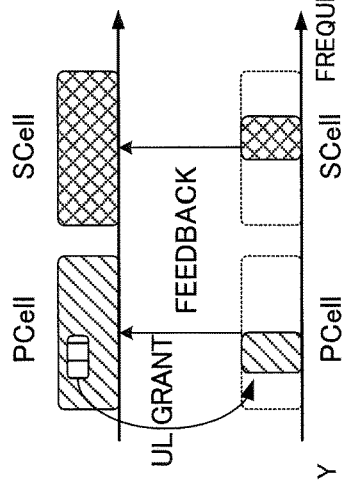
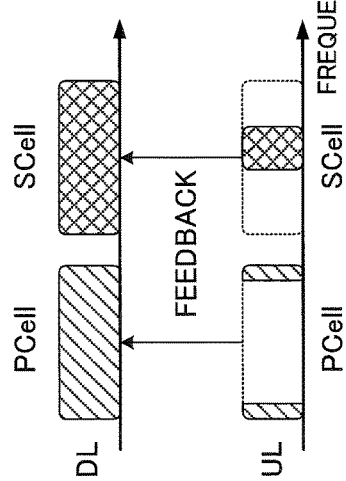

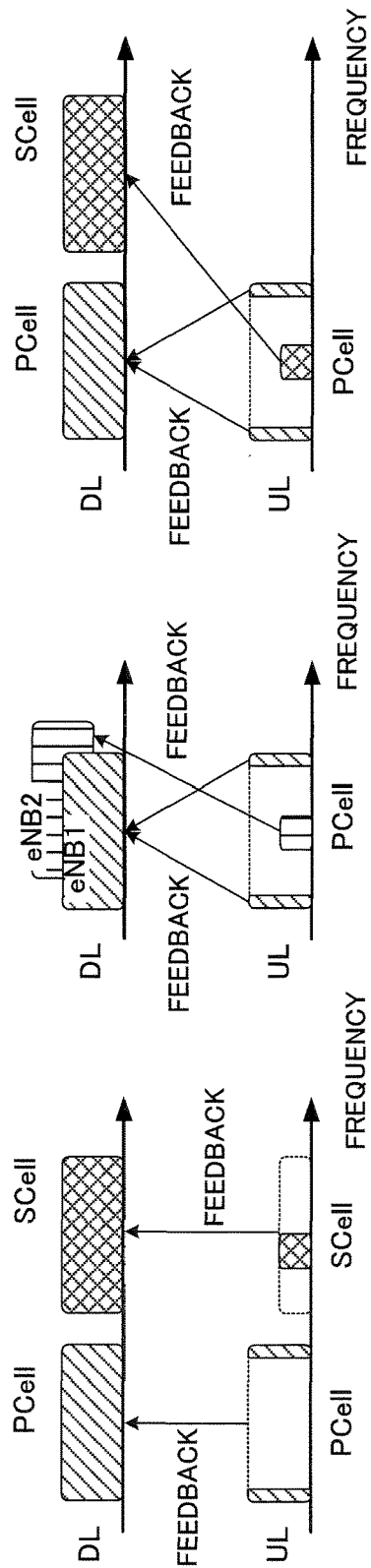

FIG.11

| CC WHERE FEEDBACK IS DESIRED | UL GRANT | CONVENTIONAL METHOD (WITHOUT SIMULTANEOUS TRANSMISSION) | CONVENTIONAL METHOD (WITH SIMULTANEOUS TRANSMISSION) | STUDIED EXAMPLE | PROPOSED EXAMPLE (EXAMPLE 1) |
|---|---|---|---|---|---|
| PCell | N/A | P-PUCCH | P-PUCCH | P-PUCCH | P-PUCCH |
| SCell | N/A | P-PUCCH | P-PUCCH | S-PUCCH | S-PUSCH |
| PCell + SCell | N/A | P-PUCCH | P-PUCCH | P-PUCCH+ S-PUCCH | P-PUCCH+ S-PUSCH |
| PCell | PCell | P-PUSCH | P-PUCCH+ P-PUSCH | P-PUSCH | P-PUSCH |
| SCell | PCell | P-PUSCH | P-PUCCH+ P-PUSCH | P-PUSCH+ S-PUCCH | P-PUSCH+ S-PUSCH |
| PCell + SCell | PCell | P-PUSCH | P-PUCCH+ P-PUSCH | P-PUSCH+ S-PUCCH | P-PUSCH+ S-PUSCH |
| PCell | SCell | S-PUSCH | P-PUCCH+ S-PUSCH | P-PUCCH+ S-PUSCH | P-PUCCH+ S-PUSCH |
| SCell | SCell | S-PUSCH | P-PUCCH+ S-PUSCH | S-PUSCH | S-PUSCH |
| PCell + SCell | SCell | S-PUSCH | P-PUCCH+ S-PUSCH | P-PUCCH+ S-PUSCH | P-PUCCH+ S-PUSCH |
| PCell | Pcell + SCell | N/A | P-PUCCH+ P-PUSCH+ S-PUSCH | P-PUSCH+ S-PUSCH | P-PUSCH+ S-PUSCH |
| SCell | Pcell + SCell | N/A | P-PUCCH+ P-PUSCH+ S-PUSCH | P-PUSCH+ S-PUSCH | P-PUSCH+ S-PUSCH |
| PCell + SCell | Pcell + SCell | N/A | P-PUCCH+ P-PUSCH+ S-PUSCH | P-PUSCH+ S-PUSCH | P-PUSCH+ S-PUSCH |

FIG.12

| CC WHERE FEEDBACK IS DESIRED | UL GRANT | CONVENTIONAL METHOD (WITHOUT SIMULTANEOUS TRANSMISSION) | CONVENTIONAL METHOD (WITH SIMULTANEOUS TRANSMISSION) | STUDIED EXAMPLE | PROPOSED EXAMPLE (EXAMPLE 2) |
|---|---|---|---|---|---|
| PCell | N/A | P-PUCCH | P-PUCCH | P-PUCCH | P-PUCCH |
| SCell | N/A | P-PUCCH | P-PUCCH | S-PUSCH | S-PUSCH |
| PCell + SCell | N/A | P-PUCCH | P-PUCCH | P-PUCCH+ S-PUSCH | P-PUCCH+ S-PUSCH |
| PCell | PCell | P-PUSCH | P-PUCCH+ P-PUSCH | P-PUSCH | P-PUSCH |
| SCell | PCell | P-PUSCH | P-PUCCH+ P-PUSCH | P-PUSCH+ S-PUCCH | P-PUSCH+ S-PUSCH |
| PCell + SCell | PCell | P-PUSCH | P-PUCCH+ P-PUSCH | P-PUSCH+ S-PUCCH | P-PUSCH+ S-PUSCH |
| PCell | SCell | S-PUSCH | P-PUCCH+ S-PUSCH | P-PUCCH+ S-PUSCH | P-PUCCH+ S-PUSCH |
| SCell | SCell | S-PUSCH | P-PUCCH+ S-PUSCH | S-PUSCH | S-PUSCH |
| PCell + SCell | SCell | S-PUSCH | P-PUCCH+ S-PUSCH | P-PUCCH+ S-PUSCH | P-PUCCH+ S-PUSCH |
| PCell | Pcell + SCell | N/A | P-PUCCH+ P-PUSCH+ S-PUSCH | P-PUSCH+ S-PUSCH | P-PUCCH+ P-PUSCH+ S-PUSCH |
| SCell | Pcell + SCell | N/A | P-PUCCH+ P-PUSCH+ S-PUSCH | P-PUSCH+ S-PUCCH+ S-PUSCH | P-PUCCH+ P-PUSCH+ S-PUSCH |
| PCell + SCell | Pcell + SCell | N/A | P-PUCCH+ P-PUSCH+ S-PUSCH | P-PUCCH+ P-PUSCH+ S-PUCCH+ S-PUSCH | P-PUCCH+ P-PUSCH+ S-PUSCH |

| FEEDBACK RESOURCE INDICATION FIELD | INDICATED PUSCH RB |
|---|---|
| 00 | RB#10 |
| 01 | RB#14 |
| 10 | RB#20 |
| 11 | RB#22 |

USER TERMINAL, RADIO BASE STATION AND RADIO COMMUNICATION METHOD

TECHNICAL FIELD

The present invention relates to a user terminal, a radio base station and a radio communication method in a next-generation mobile communication system.

BACKGROUND ART

In LTE (Long Term Evolution) and successor systems of LTE (referred to as, for example, "LTE-advanced," "FRA (Future Radio Access)" and "4G"), a radio communication system (referred to as, for example, "HetNet" (Heterogeneous Network)), in which small cells (including pico cells, femto cells and so on) having relatively small coverages of a radius of approximately several meters to several tens of meters are placed in a macro cell having a relatively large coverage of a radius of approximately several hundred meters to several kilometers, is under study (see, for example, non-patent literature 1).

For this radio communication system, a scenario to use the same frequency band in both the macro cell and the small cells (also referred to as, for example, "co-channel") and a scenario to use different frequency bands between the macro cell and the small cells (also referred to as, for example, "separate frequencies") are under study. The latter scenario is under study to use a relatively low frequency band (for example, 0.8 GHz or 2 GHz) in the macro cell and use a relatively high frequency band (for example, 3.5 GHz or 10 GHz) in the small cells.

Also, the system band of the LTE-A system (Rel. 10/11) includes at least one component carrier (CC), where the system band of the LTE system constitutes one unit. Gathering and grouping a plurality of component carriers (cells) into a wide band is referred to as "carrier aggregation" (CA).

Furthermore, in the LTE-A system, coordinated multi-point (CoMP) transmission/reception techniques are under study as techniques to realize inter-cell orthogonalization. In this CoMP transmission/reception, a plurality of cells coordinate and perform the process for transmitting and receiving signals, for one user terminal UE or for a plurality of user terminals UE. For example, on the downlink, simultaneous transmission by multiple cells employing precoding, coordinated scheduling/beamforming and so on are under study. By employing these CoMP transmission/reception techniques, improvement of throughput performance is expected, especially with respect to user terminals UE located on cell edges.

CITATION LIST

Non-Patent Literature

Non-Patent Literature 1: 3GPP TR 36.814 "E-UTRA Further Advancements for E-UTRA Physical Layer Aspects"

SUMMARY OF INVENTION

Technical Problem

As noted earlier, carrier aggregation (CA) and coordinated transmission (CoMP), introduced in Rel. 10/11, are premised upon controlling a plurality of CCs or a plurality of transmitting/receiving points, with a scheduler mounted in one radio base station (eNB), in a centralized manner. In this case, feedback signals to be transmitted from user terminals such as delivery acknowledgement signals (HARQ) and so on are assigned to an uplink control channel (PUCCH) of a predetermined cell when there is no uplink data transmission command (UL grant).

Meanwhile, future radio communication systems (for example, Rel. 12 and later versions) anticipate employing CA and CoMP between a macro base station (MeNB) that forms a macro cell and small base stations (SeNBs) that form small cells (inter-eNB CoMP/CA). That is, the macro base station and the small base stations each carry out scheduling independently based on feedback signals (delivery acknowledgement signals, channel quality information (CSI) and so on) that are fed back from serving user terminals.

Consequently, when CoMP/CA is executed between radio base stations (inter-eNB CoMP/CA), it is preferable that user terminals transmit feedback signals to each radio base station directly, as much as possible, so as to allow adequate scheduling in each radio base station. However, according to the feedback mechanism up to Rel. 10/11, if there is no uplink data signal transmission command (UL grant), a feedback signal for an SCell (for example, a small cell) is fed back in an uplink control channel on a PCell (for example, a macro cell). That is, with conventional feedback mechanism, it is difficult to transmit feedback information to a plurality of radio base stations separately.

The present invention has been made in view of the above, and it is therefore an object of the present invention to provide a user terminal, a radio base station and a radio communication method, whereby adequate feedback on the uplink is made possible even when CA and CoMP are employed between a plurality of radio base stations (inter-eNB CoMP/CA).

Solution to Problem

A user terminal, according to the present invention, has a receiving section that receives downlink signals from a first radio base station that forms a first cell and a second radio base station that forms a second cell, a generating section that generates a feedback signal in response to the downlink signal from each radio base station, and an assignment control section that assigns the feedback signal in response to the downlink signal from the first radio base station to an uplink control channel and/or an uplink shared channel on the first cell depending on whether or not there is a UL grant, and assigns the feedback signal in response to the downlink signal from the second radio base station to the uplink shared channel on the first cell or the second cell regardless of whether or not there is the UL grant.

Advantageous Effects of Invention

According to the present invention, even when CA and CoMP are employed between a plurality of radio base stations (inter-eNB CoMP/CA), it is still possible to carry out adequate feedback on the uplink.

BRIEF DESCRIPTION OF DRAWINGS

FIG. 1 provides conceptual diagrams of a HetNet;

FIG. 5 provides diagram to show a feedback method in Rel. 10/11;

FIG. 6 provides diagrams to show a feedback method in Rel. 10/11 (upon UL grant detection error);

FIG. 7 provides diagrams to show a feedback method (studied example) in the event the PUCCH is configured in an SCell;

FIG. 8 provides diagrams to show an example of the feedback method of the present embodiment;

FIG. 10 provides diagrams to show an example of transmission power control in the event the feedback method of the present embodiment is employed;

FIG. 11 is a diagram to show examples of channels to use for feedback in the event the feedback method of the present embodiment is employed (example 1);

FIG. 12 is a diagram to show other examples of channels to use for feedback in the event the feedback method of the present embodiment is employed (example 2);

DESCRIPTION OF EMBODIMENTS

FIG. 1 provides conceptual diagrams of a HetNet. FIG. 1A shows a case where the same frequency band is used between a macro cell and small cells, and FIG. 1B shows a case where different frequency bands are used between a macro cell and small cells.

As shown in FIG. 1, a HetNet refers to a radio communication system in which a macro cell M and small cells S are arranged to overlap each other geographically at least in part. Also, a HetNet is comprised of a radio base station that forms a macro cell M (hereinafter referred to as a "macro base station"), radio base stations that form small cells S (hereinafter referred to as "small base stations"), and a user terminal UE that communicates with the macro base station and the small base stations.

In the case illustrated in FIG. 1A, it is possible to use, for example, a carrier of the same frequency band such as 800 MHz and 2 GHz in the macro cell M and the small cells S. On the other hand, in the case illustrated in FIG. 1B, for example, a carrier of a relatively low frequency band such as 800 MHz and 2 GHz is used in the macro cell M. Meanwhile, in a plurality of small cells S, for example, a carrier of a relatively high frequency band such as 3.5 GHz is used.

In this way, for radio communication systems of LTE-A (Rel. 12 and later versions), in addition to a scenario to employ the same frequency between small cells S and a macro cell M (co-channel), a scenario to employ different frequencies between small cells S and a macro cell M (separate frequencies) is also under study.

Also, when small cells and a macro cell are operated under different radio base stations, the macro base station (MeNB) and the small base stations (SeNBs) are connected via backhaul and exchange information mutually. The connection between the macro base station and the small base stations may assume wire connection by means of optical fiber, non-optical fiber (X2 interface) and so on, or may assume wireless connection. Note that, when the macro base station and the small base stations are connected via channels other than optical fiber (for example, via the X2 interface), the delay time in the transmission/reception of information between the macro base station and the small base stations is not negligible. Although, ideally, the transmission delay of backhaul is zero millisecond, there is nevertheless a possibility that the transmission delay becomes maximum several tens of milliseconds, depending on the environment of backhaul.

Figure 2B:
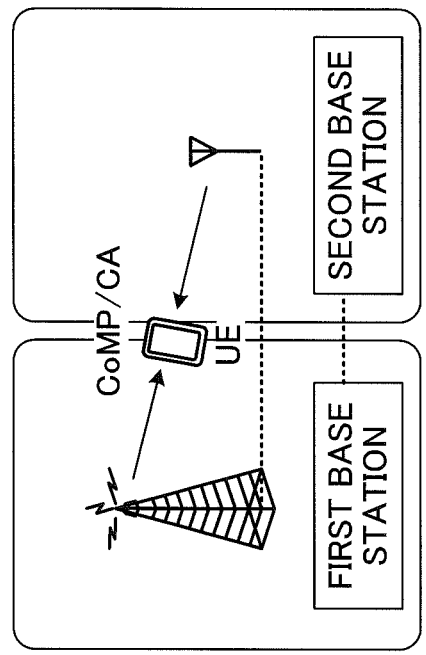
FIG. 2 provides conceptual diagrams of CoMP/CA in a radio base station and CoMP/CA between radio base stations.
Figure 2A:
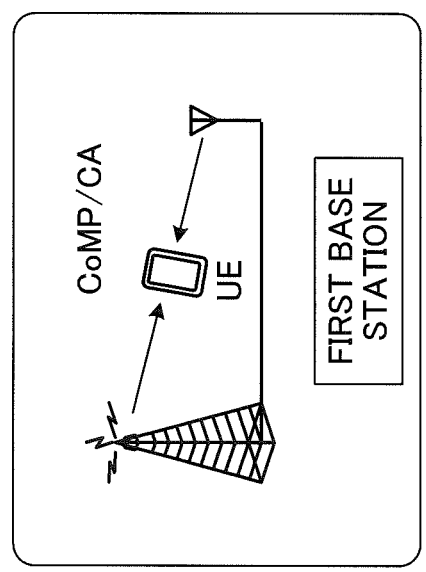

Now, carrier aggregation (CA) and coordinated transmission (CoMP), introduced in Rel. 10/11, are premised upon controlling a plurality of CCs or a plurality of transmitting/receiving points, with a scheduler mounted in one radio base station, in a centralized manner (see FIG. 2A). Meanwhile, future radio communication systems (Rel. 12 and later versions) need to support CA and CoMP between different radio base stations that are connected via backhaul, over which the delay is not negligible (see FIG. 2B).

In this way, in order to support CA and CoMP between different radio base stations, each radio base station has to carry out scheduling adequately. To allow each radio base station to adequately schedule downlink data to transmit to user terminals in a downlink shared channel (PDSCH), the user terminals have to transmit feedback signals on the uplink adequately. The feedback signals include delivery acknowledgement signals (ACK/NACK) to indicate whether or not downlink data (PDSCH signal) can be decoded, channel quality information (CSI) that is measured using downlink reference signals (CSI-RSs), and so on.

Figure 3:
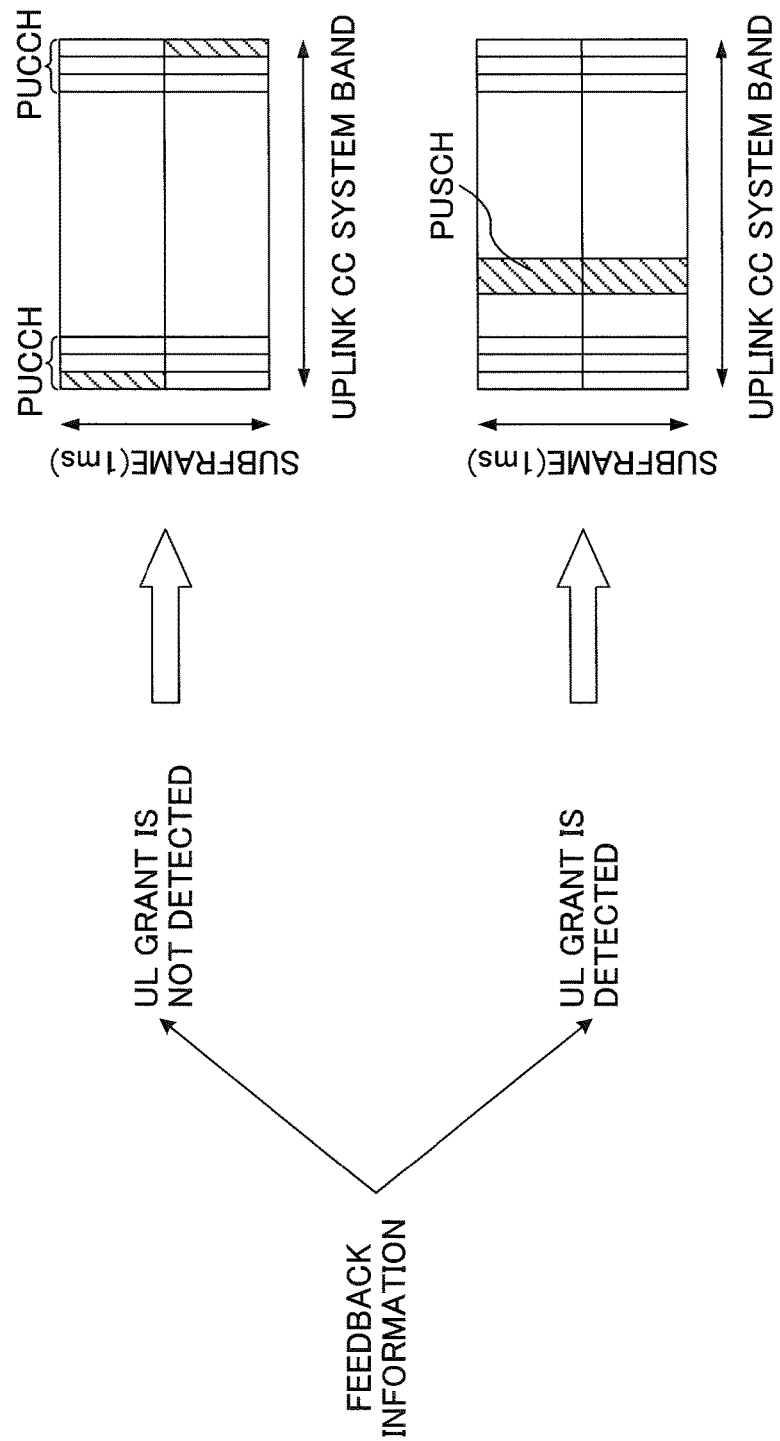
FIG. 3 is a diagram to show an example of a feedback signal assignment method on the uplink.

In LTE (Rel. 8), when a control signal (UL grant) to command uplink data transmission in an uplink shared channel (PUSCH) is detected, a user terminal transmits a feedback signal using the PUSCH resource assigned by the UL grant (see FIG. 3). On the other hand, when no UL grant is detected, the user terminal transmits a feedback signal using an uplink control channel (PUCCH) (see FIG. 3). That is, when transmitting uplink data, the user terminal transmits feedback signals with the uplink data by using the PUSCH, and, when not transmitting uplink data, transmits feedback signals by using the PUCCH.

Figure 4A:
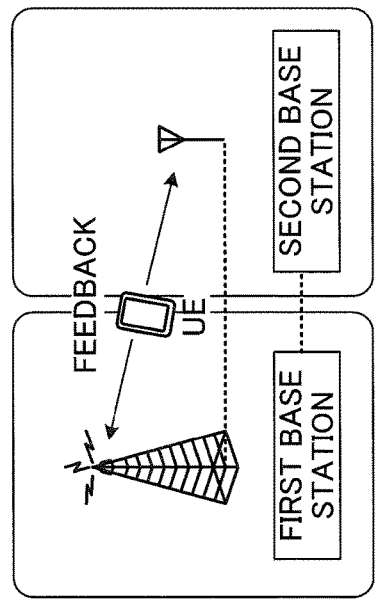
FIG. 4 provides diagrams to show an example of a feedback signal assignment method on the uplink.
Figure 4C:
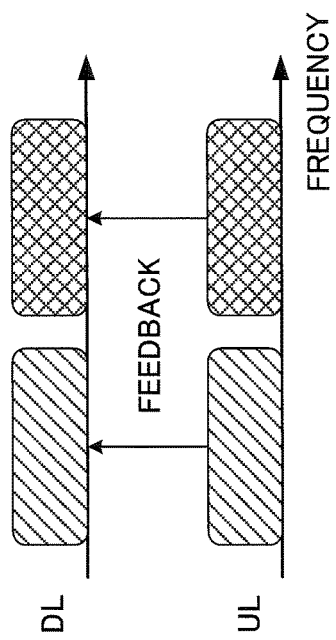
Figure 4B:
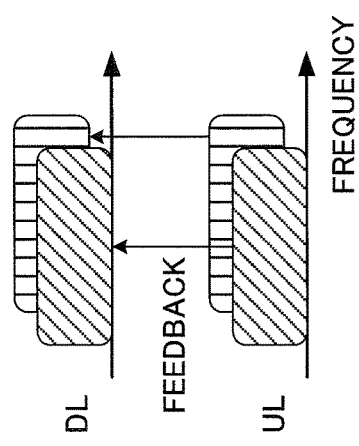

When CA and CoMP are employed between different radio base stations, it is preferable that user terminals transmit feedback signals to each radio base station directly, as much as possible, so as to allow adequate scheduling in each radio base station (see FIGS. 4A to 4C). However, with the feedback mechanism up to Rel. 10/11, when CA is employed, it is difficult to transmit feedback signals to a plurality of radio base stations separately. Now, the feedback method in Rel. 10/11 in the event carrier aggregation (CA) is executed will be described below with reference to the accompanying drawings. Note that the following description will assume a case where there is one primary cell (PCell) and one or a plurality of secondary cells (SCells) on both the uplink and the downlink.

When a user terminal that is not configured to transmit an uplink control channel (PUCCH) and an uplink shared channel (PUSCH) simultaneously detects no UL grant, the user terminal transmits feedback signals (delivery acknowledgement signal, CSI and so on) by using the PUCCH on the PCell (see FIG. 5A). On the other hand, when a UL grant is detected, the user terminal transmits feedback signals with uplink data by using the PUSCH of the cell where the UL grant is detected. To be more specific, when detecting a UL grant in the PCell, the user terminal sends feedback using the PUSCH on the PCell (see FIG. 5B), and, when detecting a UL grant in the SCell, the user terminals sends feedback using the PUSCH on the SCell (see FIG. 5C). Note that when UL grants are detected in a plurality of cells at the same time, the user terminals sends feedback using the PUSCH on the PCell.

When a user terminal that is configured to transmit the PUCCH and the PUSCH simultaneously detects no UL grant, the user terminal transmits feedback signals using the PUCCH on the PCell (see above FIG. 5A). On the other hand, when the user terminal detects a UL grant, the user terminal sends feedback using the PUCCH and/or the PUSCH on the PCell. That is, even when a UL grant is detected, part of the feedback signals (delivery acknowledgement signal (ACK/NACK)) is transmitted using the PUCCH (at the same time with the PUSCH assigned by the UL grant).

Note that the simultaneous transmission of the PUCCH and the PUSCH is configured as appropriate by the radio base stations depending on each user terminal's capability (performance). A user terminal that does not transmit the PUCCH and the PUSCH simultaneously carries out single carrier transmission regardless of whether or not there is a UL grant, and therefore can be built with inexpensive RF circuitry. Meanwhile, since the PUCCH, which is redundant in comparison to the PUSCH, is robust against interference and thermal noise and the signal can be detected with high likelihood, a user terminal that transmits the PUCCH and the PUSCH simultaneously can improve the accuracy of feedback by transmitting feedback signals using the PUCCH.

Note that whether or not each user terminal is capable of transmitting the PUCCH and the PUSCH simultaneously is reported to the radio base stations as user terminal capability information (UE capability). The radio base stations configure simultaneous transmission of the PUCCH and the PUSCH as appropriate based on each user terminal's capability, and send commands to each user terminal through higher layer signaling (for example, RRC signaling).

In this way, according to the feedback mechanism up to Rel. 10/11, when there is no UL grant, feedback signals for an SCell (for example, a small cell) are fed back in the PUCCH of a PCell (for example, a macro cell). Usually, scheduling in each radio base station is carried out in one-ms (one-subframe) units, so that, when the delay of backhaul between different base stations is unnegligible, there is a threat that the throughput decreases due to the impact of delay between the radio base stations. Also, when feedback signals for SCells are all assigned to the PUCCH of a PCell, there is a threat that the capacity of the PUCCH on the PCell may run short depending on the communicating environment.

Consequently, in order to feed back feedback signals in uplink CCs corresponding to each downlink CC (cell), it may be possible to transmit UL grants and assign the PUSCH to these uplink CCs. For example, in order allow a user terminal to feed back feedback signals via an SCell, it may be possible to transmit a UL grant on the SCell and assign PUSCH resource even when there is no uplink data.

However, when, in this way, a UL grant is transmitted in a downlink signal of an SCell and feedback is sent using the SCell's PUSCH resource, it is not possible to transmit a UL grant of a PCell at the same time. This is because, when a UL grant of a PCell is detected, a user terminal sends feedback using the PUSCH on the PCell.

Also, when a user terminal is unable to detect a UL grant (in the event of a detection error), the user terminal cannot send feedback using the PUSCH, and there is a threat that feedback is sent using the PUCCH of an unintended CC (cell). For example, referring to above FIGS. 5B and 5C, when a user terminal is unable to detect the UL grant, the feedback signals are fed back in the uplink control channel (PUCCH) on the PCell (see FIGS. 6A to 6C).

In this way, when, by utilizing a UL grant of an SCell, feedback signals are fed back using the PUSCH on the SCell, the problem that the transmission of UL grants in a PCell is limited, and the problem that adequate feedback is not possible upon UL grant detection errors arise. Meanwhile, to solve such problems, it may be possible to use the PUCCH on the uplink in an SCell, as in a PCell. That is, when no UL grant is detected, a user terminal transmits cell-specific feedback signals using each cell's PUCCH (see FIG. 7A). Then, when a UL grant is detected, the user terminals may transmit cell-specific feedback signals using each cell's PUSCH (see FIGS. 7B and 7C).

By employing the feedback method shown in FIG. 7, it is possible to send feedback on a cell-specific basis. However, since a user terminal needs to be able to transmit the PUCCH in all of the uplink CCs to feed back separately, there is a problem that the circuit structure of the user terminal becomes complex. Also, when CoMP is executed between radio base stations (inter-eNB CoMP), or when CA is executed between radio base stations (inter-eNB CA) only on the downlink (on the uplink, one CC is used and CA is not carried out), there is no SCell on the uplink, so that a new, different solution is necessary. As a result of this, it is necessary to implement additional technology.

So, the present inventors have focused on the above problems and come up with the idea of feeding back feedback signal for SCells by using the PUSCH regardless of whether or not there is a UL grant. In particular, the present inventors have focused on the fact that, when CA is employed between a macro base station and small base stations, in the small cells (SCells), compared to the macro cell (PCell), the number of connecting user terminals is small and the capacity of resources is plenty, and found out sending feedback signal for the SCells by using the PUSCH on the SCells regardless of whether or not there is a UL grant.

Also, the present inventors have conceived of a new PUSCH resource assignment method to use when sending feedback signal for SCells by using the PUSCH regardless of whether or not there is a UL grant. To be more specific, the present inventors have conceived of changing the assignment of PUSCH resources depending on whether or not there is a UL grant of SCells, and, when, for example, a user terminal detects no UL grant, assigning PUSCH resources by using downlink control information (DL assignment)

Now, the present embodiment will be described in detail below with reference to the accompanying drawings. Note that although examples will be illustrated in the following description where CoMP and/or CA (inter-eNB CoMP/CA)

is executed between a macro base station and small base stations, the present embodiment is by no means limited to this, and is applicable as long as control is executed between different radio base stations. Also, the following description will assume that the PCell is a macro cell and the SCells are small cells, the present embodiment is by no means limited to this.

First Example

FIG. 8 shows an example of an uplink feedback method in the event CA is employed between a first base station and a second base station. Note that FIG. 8 shows a case where the first base station forms a macro cell (PCell) and the second base station forms a small cell (SCell). To be more specific, FIG. 8A is equivalent to a case where no UL grant is contained in the downlink signals on the PCell and the SCell, FIG. 8B is equivalent to a case where a UL grant is contained only in the downlink signal of the PCell, and FIG. 8C is equivalent to a case where a UL grant is contained only in the downlink signal on the SCell.

As shown in FIG. 8A, when no UL grant is contained in the downlink signals on the PCell and the SCell, a user terminal feeds back feedback signals in response to the downlink signal on the PCell by using an uplink control channel (PUCCH) on the PCell. Meanwhile, the user terminal feeds back feedback signals in response to the downlink signal on the SCell by using an uplink shared channel (PUSCH) on the SCell. In this case, the PUSCH resource where the feedback signals for the SCell are assigned can be indicated from a radio base station (for example, the macro base station) by way of higher layer signaling and so on.

When, as shown in FIG. 8B, a UL grant is contained only in the downlink signal on the PCell, the user terminal sends feedback signals in response to the downlink signal on the PCell by using the PUSCH on the PCell. Also, the user terminal sends feedback signals in response to the downlink signal of the SCell by using the PUSCH on the SCell. In this case, the PUSCH resource where the feedback signals for the SCell are assigned can be indicated from a radio base station (for example, the macro base station) by way of higher layer signaling and so on.

As shown in FIG. 8C, when a UL grant is contained in only in the downlink signal on the SCell, the user terminal sends the feedback signals in response to the downlink signal on the PCell by using the PUCCH on the PCell. Also, the user terminal sends the feedback signals in response to the downlink signal on the SCell by using the PUSCH on the SCell. In this case, the PUSCH resource where the feedback signals for the SCell are assigned can be indicated using a UL grant.

In this way, by feeding back feedback information in response to the downlink signal on the SCell by using the PUSCH regardless of whether or not there is a UL grant, it is possible to support all the transmission patterns in Rel. 10/11 such as uplink simultaneous transmission and non-simultaneous transmission. By this means, it is possible to use the circuitry up to Rel. 10/11 in the user terminal, so that it is possible to save the manufacturing cost of the user terminal. Also, even when the user terminal is unable to detect a UL grant from the SCell (in the event of a detection error), it is still possible to feed back feedback signals for the SCell to the SCell directly.

Figure 9A:
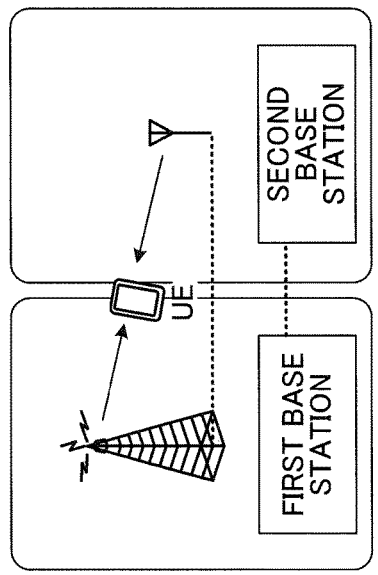
FIG. 9 provides diagrams to show another example of the feedback method of the present embodiment.
Figure 9C:
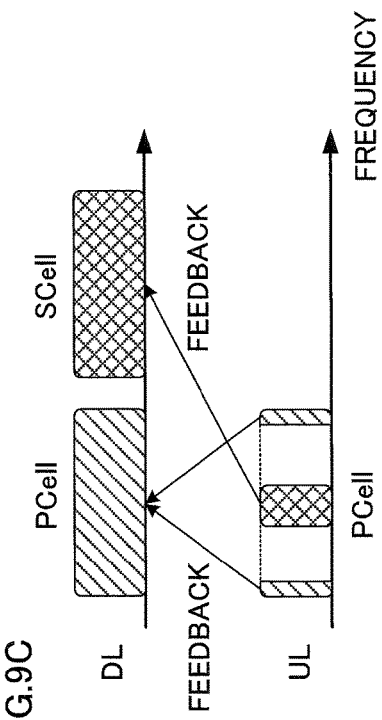
Figure 9B:
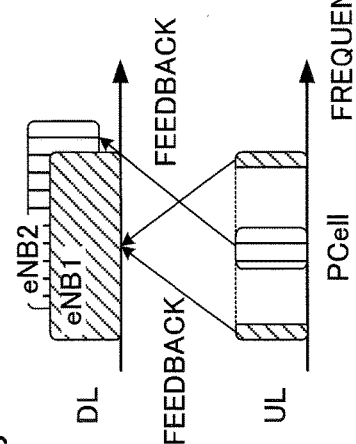

Also, the feedback method shown in above FIG. 8 is applicable when CoMP is employed between radio base stations, when CA is employed between radio base stations only on the downlink (on the uplink, the PCell alone is so configured) (FIGS. 9A to 9C) and so on.

For example, when the first base station and the second base station are operated in the same frequency, the user terminal feeds back the feedback signals for the PCell by using the PUCCH on the PCell. Meanwhile, the user terminal feeds back the feedback signals for the SCell by using the PUSCH on the PCell (see FIG. 9B).

Also, even when the first base station and the second base station are operated in different frequencies, the user terminal feeds back the feedback signals for the PCell by using the PUCCH on the PCell. Meanwhile, the user terminal feeds back the feedback signals for the SCell by using the PUSCH on the PCell (see FIG. 9C).

As shown in above FIG. 7, with the method of configuring the PUCCH for the SCell as well, it is necessary employ a new, different feedback method when CoMP is executed between radio base stations or when CA is executed between radio base stations only on the downlink. However, with the feedback method shown in above FIG. 9, it is possible to employ the same feedback mechanism even when CoMP is employed between base stations or when CA is employed between base stations only on the downlink.

In uplink signal transmission power control, according to LTE. 10/11, transmission power is controlled independently between the PUCCH and the PUSCH, and, furthermore, transmission power is controlled independently between the PCell and the SCell as well. Consequently, as shown in above FIG. 9, by assigning feedback signals for the SCell to PUSCH resources, it is possible use the mechanism of transmission power control of LTE. 10/11 on an as-is basis.

For example, when no UL grant is contained in the downlink signals on the PCell and the SCell (see above FIG. 8A), a user terminal that is located near a second base station (small base station) can control the transmission power of the PUCCH on the PCell and the PUSCH on the SCell separately (see FIG. 10A). Similarly, even when CoMP is employed between radio base stations or when CA is employed between radio base stations only on the downlink, it is possible to control the transmission power of the PUCCH and the PUSCH independently (see FIGS. 10B and 10C).

In this way, by using the feedback method of the present embodiment, even when a user terminal is near a given radio base station (for example, a small base station) and the propagation loss (path loss) varies between a plurality of radio base stations, it is possible to configure adequate transmission power and send feedback.

Now, the CCs (cells) where feedback is desired and the feedback channels to use in the event the feedback method of the present embodiment is employed when CA is executed between radio base stations will be described with reference to FIG. 11 and FIG. 12. Note that FIG. 11 and FIG. 12 illustrate the feedback method of the present embodiment (proposed example), the conventional feedback method, and the feedback method to use the PUCCH on the SCell shown in above FIG. 7 (studied example) by comparison.

Note that the difference between FIG. 11 (example 1) and FIG. 12 (example 2) is whether or not to use the PUCCH of the PCell in the proposed method when UL grants are sent from the PCell and the SCell at the same time. To be more specific, in FIG. 11 (example 1), the studied example and the proposed example both show cases where "without simultaneous transmission" in the conventional method is enhanced, so that it is possible to carryout transmission in the least possible number of simultaneous transmissions. By this means, it is possible to reduce the load on the RF circuitry of the user terminal and improve the power efficiency.

Also, in FIG. 12 (example 2), the studied example and the proposed example both show cases where "with simultaneous transmission" in the conventional method is enhanced. The studied example in example 2 shows cases where feedback is sent in the PUCCH as much as possible, for both the PCell and the SCell—that is, cases where feedback is sent using the PUCCH even for the SCell. Also, the proposed method in example 2 shows cases where feedback for the PCell is sent using the PUCCH as much as possible. On the other hand, feedback for the SCell is sent using the PUSCH, regardless of whether or not there is a UL grant. In this way, by sending feedback by using the PUCCH on the PCell (for example, the macro cell), the connecting with which needs to be maintained, as much as possible, it is possible to secure the quality of feedback signals.

<CoMP Between Radio Base Stations>

When CoMP is executed between radio base stations, the radio base stations operate in the same frequency, so that no there is no distinction between the PCell and the SCell. Consequently, when feedback needs to be sent to different base stations separately as when CA is executed between radio base stations, it is necessary to change the feedback resource (PUCCH or PUSCH) in a single cell. That is, a user terminal has to identify to which radio base station feedback in response to a received downlink signal should be addressed, and change the feedback resource for the delivery acknowledgement signal (ACK/NACK) depending on from which base station downlink data has been transmitted. However, as noted earlier, when CoMP is executed between the radio base stations, the radio base stations operate in the same frequency, and therefore the user terminal has difficulty identifying the destination of feedback as easily as when CA is executed between radio base stations.

So, according to the present embodiment, when the user terminal sends feedback to the second base station (small base station) in the same way as when CA is executed between radio base stations, the user terminals sends feedback using the PUSCH, and determines the radio base station to send feedback to, based on higher layer signaling or downlink control information (DL assignment) reported from the radio base stations.

For example, the user terminal sends the feedback in response to the macro base station in the PUCCH in advance, and sends the feedback in response to the small base stations in PUSCH resource that is reported in advance through higher layer such as RRC signaling and so on. By so doing, it is possible to separately send feedback to a plurality of radio base stations, where CoMP is executed between the radio base stations, by using different resources. Also, even when, for example, feedback is sent to two radio base stations at the same time, the PUCCH and the PUSCH are transmitted simultaneously in the same CC, and, since this can be realized with the circuit structure for simultaneous transmission in uplink channels that was already introduced in Rel. 10/1, there is an advantage that the increase of cost can be reduced.

Also, when the user terminal detects a downlink control signal (DL assignment) that reports downlink shared channel (PDSCH) scheduling information, the user terminal feeds back a delivery acknowledgement signal. Consequently, the user terminal can determine the radio base station to send feedback to based on the DL assignment. That is, a user terminal that is configured for CoMP between radio base stations from higher layer can determine the radio base station to send feedback to, based on the type (PDCCH or enhanced PDCCH), the configuration (for example, the control signal format (the DCI format), the aggregation level, etc.) and so on of the control channel corresponding to the DL assignment received. Alternatively, the user terminal can determine the radio base station to send feedback to based on bits contained in the DL assignment received.

<Feedback Operation>

Figure 13A:
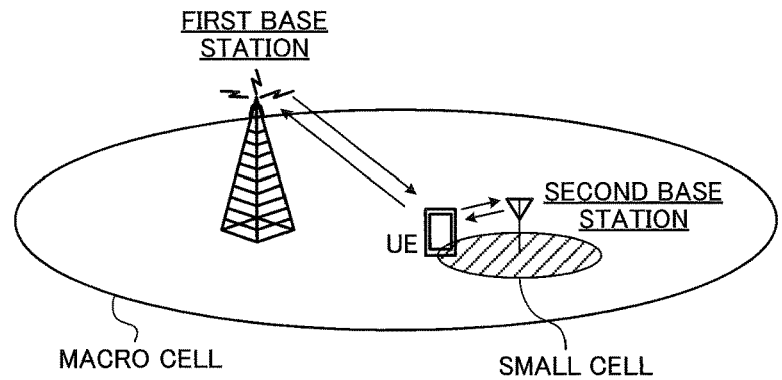
FIG. 13 is a sequence diagram to show an example of the steps of operation in radio communication the event the feedback method of the present embodiment is employed.
Figure 13B:
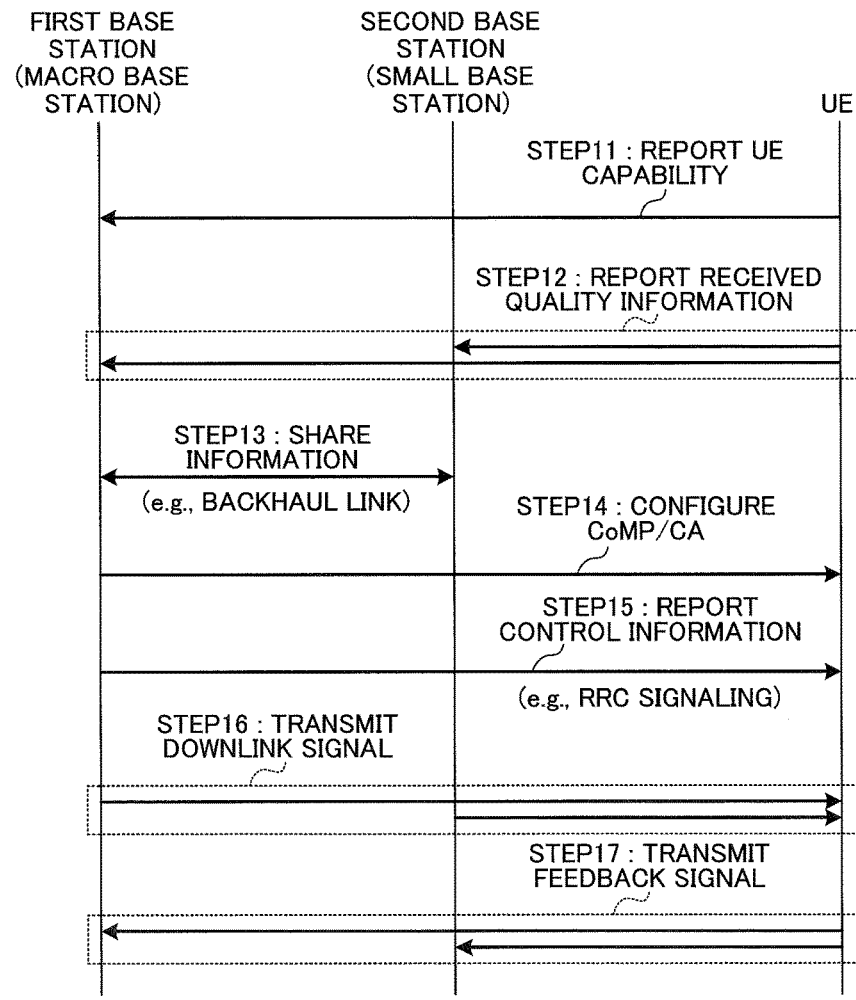

Next, an example of the steps of operation in the communication method between a user terminal and radio base stations in the event CoMP/CA is employed between different radio base stations will be described with reference to FIG. 13. Note that, as shown in FIG. 13A, an example with a first base station (macro base station), a second base station (small base station) and a user terminal to connect with the first base station and the second base station will be described.

First, the user terminal reports the user terminal's capability (UE capability) to a radio base station (for example, the macro base station) (step 11). By this means, the radio base station can judge whether the user terminal is capable of simultaneous transmission, whether the feedback method of the present embodiment is applicable, and so on.

Also, a radio base station receives a report regarding the quality of communication from the user terminal, and measures the received power of the signal transmitted from the user terminal (step 12). For example, the first base station and the second base station receive received quality information such as downlink received power and received quality (RSRP, RSRQ) report information, channel state (CSI) report information and so on from the user terminal. Also, the first base station and the second base station measure the received power of uplink sounding reference signals (SRS), random access (PRACH) and so on. By this means, the first base station and the second base station can judge each user terminal's channel state, location (as to the cell (or transmitting point) operated by which radio base station each user terminal is near) and so on.

Next, the first base station and the second base station share the received information, between the radio base stations, via backhaul (step 13). For example, each radio base station shares information about the traffic in the subject cell, information about the connecting user terminals, and so on, with the other radio base station, via backhaul. By this means, a radio base station (for example, the macro base station) can judge whether or not to apply CoMP/CA between radio base stations to each user terminal.

Based on the situation of each user terminal, a radio base station (for example, the macro base station) configures CoMP/CA. A case is assumed here where the first base station configures CoMP/CA between radio base stations (step 14).

In this case, the first base station reports control information for allowing the user terminal to communicate with the second base station (small base station) via higher layer signaling (for example, RRC signaling) (step 15). Note that step 14 and step 15 may be carried out at the same time. The control information to report to the user terminal includes the configuration for receiving signals from the second base station, PUSCH resource information to use when transmitting feedback signals to the second radio base station, and so on.

Also, the control information to report to the user terminal may include information to indicate the feedback rule on the uplink on the SCell (application of the conventional feedback method or application of the feedback method of the present embodiment). By this means, even when CoMP/CA is employed between radio base stations, it is still possible to control the feedback method to employ on a per user terminal basis. As a result of this, for example, it becomes possible to control the feedback method flexibly, depending on the communicating environment, and for example, use the conventional feedback method on an as-is basis when the traffic of the PUSCH is heavy in the small cell (SCell). Also, the report of CoMP/CA between radio base stations and the report of the feedback rule selection command may be sent separately on a per user terminal basis, or may be sent for all the user terminals in the cell on a shared basis.

Then, each radio base station transmits a downlink signal to the user terminal (step 16). The user terminal monitors the control channels (PDCCH, enhanced PDCCH (EPDCCH)) which the first base station and the second base station transmit, based on the control information received from a radio base station (for example, the first base station). Then, the user terminal feeds back feedback signals (delivery acknowledgement signal, CSI and so on) in response to the downlink signals received, to each radio base station (step 17).

The user terminal employing the feedback method of the present embodiment feeds back the feedback signals in response to the downlink signal from the first radio base station by using the PUCCH or the PUSCH on the PCell. To be more specific, only when uplink data to transmit to the first base station is assigned (when a UL grant is detected), does the user terminal include and transmit the feedback signals in the PUSCH resource assigned by the UL grant (see above FIG. 8B). Otherwise, the user terminal sends feedback using the PUCCH resource of the PCell (see above FIGS. 8A and 8C).

Also, the user terminal feeds back the feedback signals in response to the downlink signal from the second radio base station by using the PUSCH, regardless of whether or not there is a UL grant. To be more specific, when uplink data to transmit to the second base station is not assigned (when no UL grant is detected), the user terminal sends feedback by using the PUSCH resource reported from higher layer (see above FIG. 8B). Only when a UL grant is detected, does the user terminal include and transmit feedback signals in the PUSCH resource assigned by the UL grant (see above FIG. 8C).

In this way, by feeding back the feedback signals for the SCell by using the PUSCH regardless of whether or not there is a UL grant, it is possible to support the transmission patterns of simultaneous transmission and non-simultaneous transmission of the PUCCH and the PUSCH defined in Rel. 10/11. Also, it is possible to employ the feedback mechanism when CoMP is executed between radio base stations or when CA is executed between radio base stations only on the downlink, and, furthermore, it is possible to control transmission power independently between the PUCCH and the PUSCH and between the PCell and the SCell (use conventional transmission power control mechanism).

Second Example

With a second example, the method of configuring and reporting the PUSCH resource, where the feedback signals in response to the downlink signal of the SCell are assigned in the above first example, will be described.

According to the first example, the PUSCH resource to use to send feedback to the second radio base station (small base station) changes depending on whether or not a UL grant is detected. For example, when a user terminal detects a UL grant, the user terminals sends feedback with uplink data by using the uplink data transmission resource (PUSCH resource) that is indicated in the UL grant. On the other hand, when the user terminal detects no UL grant, the user terminal transmits feedback signals by using the feedback resource (PUSCH) configured by higher layer.

Now, as shown in above FIG. 6, there is a possibility that the user terminal fails to detect a UL grant. Consequently, the second radio base station cannot assign the PUSCH resource for feedback indicated by higher layer to other user terminals. If the user terminal fails to detect a UL grant while the PUSCH resource for feedback is assigned to another user terminal, the user terminal has to carry out transmission using the same PUSCH resource, and at the same time, with the other user terminal. As a result of this, there is a threat that a collision of the PUSCH occurs between different user terminals, and, as a consequence, the number of retransmissions increases and the throughput decreases.

Nevertheless, if the PUSCH resource for feedback indicated by higher layer is not assigned to other user terminals so as to prevent the collision of the PUSCH, the scheduling of the PUSCH is limited, and it is not possible to optimize the efficiency of the use of resources.

So, the present inventors have focused on the fact that, while delivery acknowledgement signals (ACK/NACK) may be fed back with high frequency, a user terminal detects downlink control information (DL assignment) that commands receiving the downlink PDSCH before sending feedback, and come with the idea of using this downlink control information to assign and indicate the PUSCH resource. Furthermore, the present inventors have come up with the idea of using the bits that are not used in the DL assignment in the downlink control information from the second radio base station, to indicate the PUSCH resource when a new feedback method is employed. The bits not used in the DL assignment include the ARI and the ARO (two bits each), which are used to indicate the PUCCH resource to use for feedback, and so on.

The ARI is an ACK/NACK resource indicator (A/N resource indicator), introduced in Rel. 10, and is used to designate the PUCCH corresponding to the SCell when CA is employed (FDD). For example, ACK/NACK feedback in response to PDSCH data that is indicated by a DL assignment detected on the downlink of the PCell is sent by using the PUCCH resource that is determined implicitly from the control channel element (CCE) number where the DL assignment is mapped.

Meanwhile, ACK/NACK feedback in response to PDSCH data that is indicated by a DL assignment detected on the downlink on the SCell is sent by using the PUCCH resource that is indicated by the combination of higher layer and the ARI (two bits). Note that the radio base station reports four PUCCH resource candidates through RRC signaling, and designates, among these four PUCCH resource candidates, a specific PUCCH resource by the ARI contained in downlink control information.

The ARO was introduced in Rel. 11, is included in a DL assignment in the enhanced downlink control channel (EPDCCH) and is used as an offset for shifting the PUCCH resource. To be more specific, ACK/NACK feedback in response to a DL assignment detected in the EPDCCH and the PDSCH data indicated by this DL assignment is sent using the PUCCH resource that is indicated by the addition of the enhanced control channel element (ECCE) number where the DL assignment is mapped, and the offset value represented by the ARO.

With the present embodiment, it is possible to indicate the PUSCH resource to use to feed back feedback signals for the SCell to a user terminal by using the bit field that is contained in a DL assignment and used as the ARI, the ARO and so on. By this means, the ARI and ARO bits that are not used in the new feedback method can be re-used to indicate the PUSCH resource, so that it is possible to make effective use of radio resources. Also, since it becomes unnecessary to assign fixed PUSCH resources per user terminal by using RRC signaling, it is possible to improve the efficiency of the use of resources.

Also, it is possible to configure a plurality of PUSCH resource candidates to use for feedback to the second radio base station as an PUSCH resource indication to a user terminal, and designate the PUSCH resource to actually use for feedback by using bits contained in a DL assignment. As for the bits contained in a DL assignment, the above-noted ARI and ARO (two bits each) may be used.

Figures 14A, 14B:
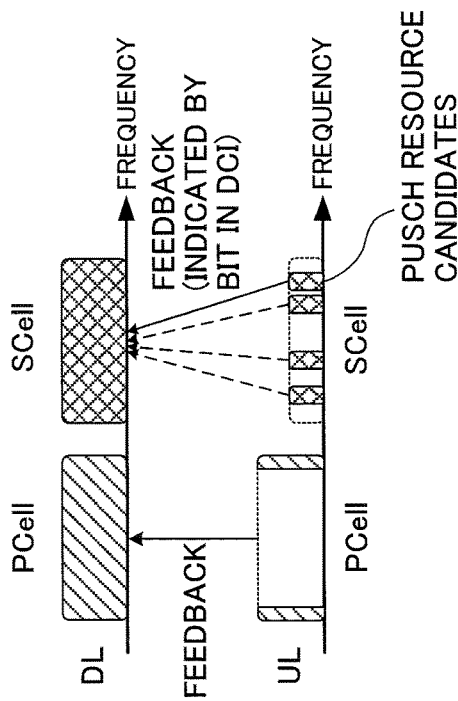
FIG. 14 provides diagrams to show an example of a PUSCH resource reporting method in the event the feedback method of the present embodiment is employed.

FIGS. 14A and 14B show an example where four PUSCH resource candidates are reported to a user terminal via higher layer signaling (for example, RRC signaling), and where the PUSCH resource to use is indicated with two bits in a DL assignment. In FIG. 14A, the user terminal assigns feedback signals to RB #10 in the PUSCH when the bit values are "00." Similarly, the user terminal assigns feedback signals to RB #14 in the PUSCH when the bit values are "01," to RB #20 in the PUSCH when the bit values are "10," and to RB #22 in the PUSCH when the bit values are "11."

In this case, the uplink data is scheduled by a UL grant and the feedback information is scheduled by the DL assignment. In this way, by indicating a specific PUSCH resource by using the combination of a plurality of PUSCH candidates indicated by higher layer and bits indicated in downlink control information, it is possible to schedule the PUSCH flexibly in the second radio base station. Also, by using the ARI and the ARO (two bits each) that are not used, as bits contained in a DL assignment, it is possible to reduce the increase of overhead.

Note that, with the present embodiment, a specific PUSCH resource may be reported by using the configuration, state and resource of the control channel corresponding to a DL assignment, in addition to (or instead of) using DL assignment bits (for example, the ARI and the ARO). For example, it may be possible to determine the PUSCH resource based on in which control channel, among a plurality of control channels (PDCCH or EPDCCH) subject to monitoring by the user terminal, the DL assignment is detected.

Alternatively, it is equally possible to report the PUSCH resource to the user terminal by using the number of resources assigned to the DL assignment in the control channel (CCE aggregation level). Alternatively, it is also possible to report the PUSCH resource to the user terminal based on the mapping method of the DL assignment (that is, depending on whether localized mapping to continuous resources in the control channel (localized transmission) is used or distributed mapping to discontinuous resources (distributed transmission) is used). By this means, it is possible to increase the PUSCH resource candidates without increasing the overhead.

Note that, although RB numbers in the PUSCH have been shown as feedback resources to carry out dynamic scheduling in the above description, this is by no means limiting, and it is equally possible to designate RB group numbers, CC numbers and so on. By this means, it becomes possible to indicate resources flexibly.

Furthermore, it is possible to include PUCCH resource number as feedback resources to carry out dynamic scheduling. As a result of this, it becomes possible to indicate resources flexibly.

Alternatively, a plurality of PUSCH resource candidates above may be defined in advance as predetermined resources. The number of user terminals is small in the SCell compared to the PCell, so that it is possible to reduce the amount of signaling such as RRC by fixing resources, instead of making resources variable. In this case, specific PUSCH resources are selected, from a plurality of PUSCH resource candidates defined in advance, by using the bits of ARI/ARO and so on.

(Variation)

With the present embodiment, when no UL grant is detected and feedback is sent by using the PUSCH, a user terminal may execute PUSCH RB hopping between slots. For the hopping patterns, the same pattern as the PUCCH hopping pattern in the PCell, or patterns that are determined from higher layer and DL assignment bits (for example, ARI and ARO), are applicable. By sending feedback by using a plurality of frequencies that vary between slots, it is possible to achieve a frequency diversity effect.

Also, when no UL grant is detected and feedback is sent using the PUSCH, the user terminal may carry out different transmission power control from that executed when a UL grant is detected. For example, the user terminal controls the transmission power of the PUSCH by using different power control parameters depending on whether or not a UL grant is detected. For example, when feedback signals alone are transmitted (when no UL grant is detected), the transmission power of the PUSCH is configured high. By this means, it is possible to improve the received quality of the PUSCH when feedback signals alone are transmitted.

Also, when no UL grant is detected and feedback is sent using the PUSCH, the user terminal may include and transmit channel state information (CSI) in the feedback signals. That is, when sending ACK/NACK feedback, the user terminal may transmit periodic or aperiodic CSI (periodic/aperiodic CSI) at the same time. Also, the channel state information (CSI) may be transmitted at the same time with the delivery acknowledgement signal (ACK/NACK) signal on a constant basis, or may be transmitted on a selective basis at predetermined times. When the channel state information (CSI) is transmitted at predetermined times, it is possible to use downlink control information (for example, bits that are not used in the DL assignment) as a trigger for CSI feedback.

In this way, by including CSI when delivery acknowledgement signals are fed back by using the PUSCH, it is possible to make effective use of PUSCH resources assigned. Furthermore, it is also possible to improve the accuracy of scheduling by transmitting delivery acknowledgement signals and channel state information at the same time.

Note that, although the above description has been given assuming that there are two radio base stations, the present embodiment is equally applicable to combinations of three or more radio base stations as well. For example, the case where three transmitting points TP1, TP2 and TP3 are all operated by different radio base stations when CoMP is executed between radio base stations may be possible. Also, the case where three cells PCell, SCell1 and SCell2 are all operated under different radio base stations when CA is executed between radio base stations may be possible.

Also, the present embodiment is equally applicable to cases where CoMP/CA in radio base stations (intra-eNB)

and CoMP/CA between radio base stations (inter-eNB) are combined. For example, the case where, in CoMP, two transmitting points TP1 and TP2 are operated by a first base station and one transmitting point TP is operated by a second base station may be possible. Also, the case where, in CA, two cells PCell and SCell are operated by a first base station and one cell SCell2 is operated by a second base station may be possible.

(Structure of Radio Communication System)

Now, an example of a radio communication system according to the present embodiment will be described in detail below.

Figure 15:
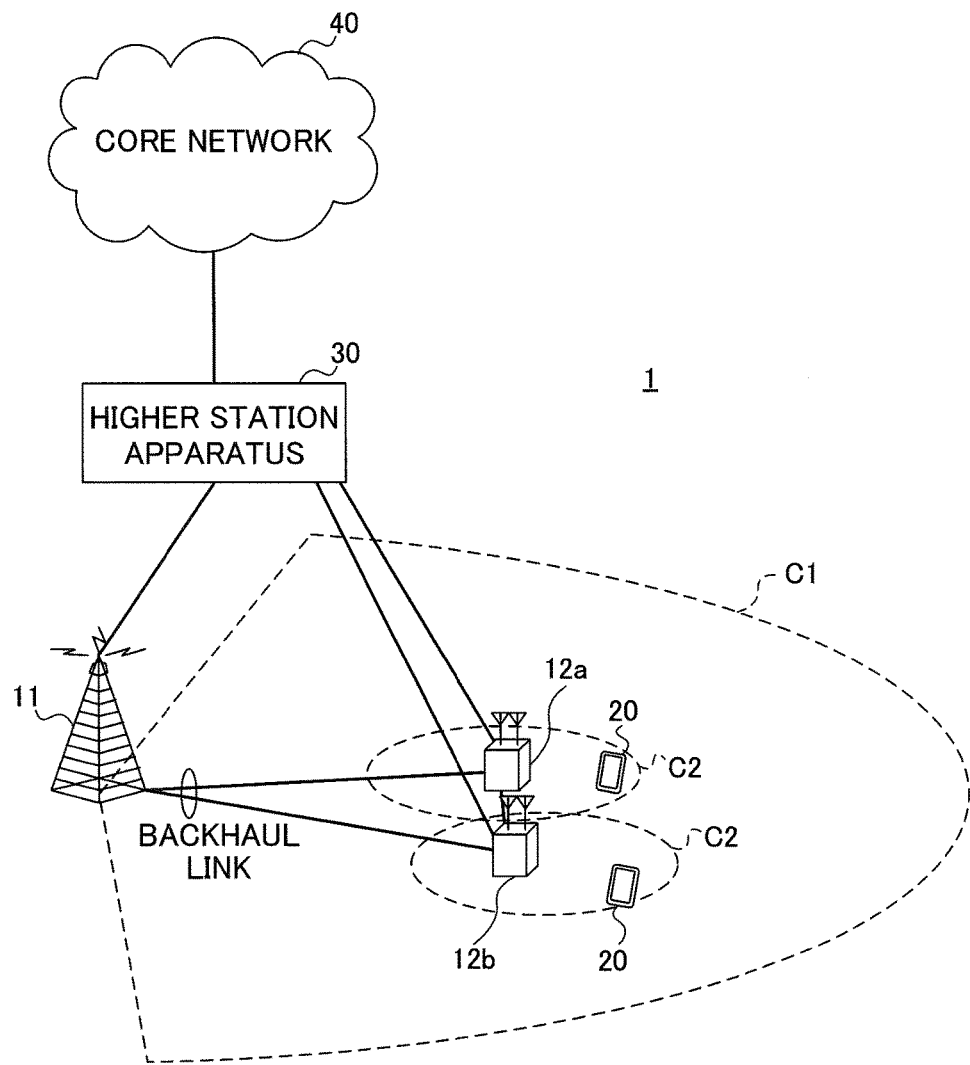
FIG. 15 is a schematic diagram to show an example of a radio communication system according to the present embodiment.

FIG. 15 is a schematic configuration diagram of a radio communication system according to the present embodiment. Note that the radio communication system shown in FIG. 7 is a system to accommodate, for example, the LTE system or SUPER 3G. This radio communication system can adopt carrier aggregation (CA) to group a plurality of fundamental frequency blocks (component carriers) into one, where the system bandwidth of the LTE system constitutes one unit. Also, this radio communication system may be referred to as "IMT-advanced," or may be referred to as "4G" or "FRA (Future Radio Access)."

The radio communication system 1 shown in FIG. 15 includes a radio base station 11 that forms a macro cell C1, and radio base stations 12a and 12b that form small cells C2, which are placed in the macro cell C1 and which are narrower than the macro cell C1. Also, in the macro cell C1 and in each small cell C2, user terminals 20 are placed. The user terminals 20 can connect with both the radio base station 11 and the radio base stations 12 (dual connectivity). Also, CoMP/CA is employed between the radio base station 11 and the radio base stations 12.

Between the user terminals 20 and the radio base station 11, communication is carried out using a carrier of a relatively low frequency band (for example, 2 GHz) and a narrow bandwidth (referred to as "existing carrier," "legacy carrier" and so on). Meanwhile, between the user terminals 20 and the radio base stations 12, a carrier of a relatively high frequency band (for example, 3.5 GHz, etc.) and a wide bandwidth may be used, or the same carrier as that used in the radio base station 11 may be used. For the carrier type between the user terminals 20 and the radio base stations 12, a new carrier type (NCT) may be used. The connection between the radio base station 11 and the radio base stations 12 (or between the radio base stations 12) is implemented by wire connection (optical fiber, the X2 interface and so on) or by wireless connection.

The radio base station 11 and the radio base stations 12 are each connected with a higher station apparatus 30, and connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with the higher station apparatus via the radio base station 11.

Note that the radio base station 11 is a radio base station having a relatively wide coverage, and may be referred to as an "eNodeB," a "macro base station," a "transmitting/receiving point" and so on. Also, the radio base stations 12 are radio base stations having local coverages, and may be referred to as "small base stations," "pico base stations," "femto base stations," "Home eNodeBs," "micro base stations," "transmitting/receiving points." Also, when no distinction is made between the radio base stations 11 and 12, these will be collectively referred to as the "radio base station 10." The user terminals 20 are terminals to support various communication schemes such as LTE, LTE-A and so on, and may include both mobile communication terminals and fixed communication terminals.

In the radio communication system, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single-carrier transmission scheme to reduce interference between terminals by dividing the system band into bands formed with one or continuous resource blocks, per terminal, and allowing a plurality of terminals to use mutually different bands.

Now, communication channels to be used in the radio communication system shown in FIG. 15 will be described. Downlink communication channels include a PDSCH (Physical Downlink Shared Channel), which is used by each user terminal 20 on a shared basis, and downlink L1/L2 control channels (a PDCCH, a PCFICH, a PHICH and an enhanced PDCCH). User data and higher control information are transmitted by the PDSCH. Scheduling information for the PDSCH and the PUSCH and so on are transmitted by the PDCCH (Physical Downlink Control Channel). The number of OFDM symbols to use for the PDCCH is transmitted by the PCFICH (Physical Control Format Indicator CHannel). HARQ ACKs/NACKs in response to the PUSCH are transmitted by the PHICH (Physical Hybrid-ARQ Indicator CHannel). Also, the scheduling information for the PDSCH and the PUSCH and so on may be transmitted by the enhanced PDCCH (EPDCCH) as well. This EPDCCH is frequency-division-multiplexed with the PDSCH (downlink shared data channel).

Uplink communication channels include the PUSCH (Physical Uplink Shared Channel), which is used by each user terminal 20 on a shared basis as an uplink data channel, and the PUCCH (Physical Uplink Control Channel), which is an uplink control channel. User data and higher control information are transmitted by this PUSCH. Also, downlink radio quality information (CQI: Channel Quality Indicator), ACKs/NACKs and so on are transmitted by the PUCCH.

Figure 16:
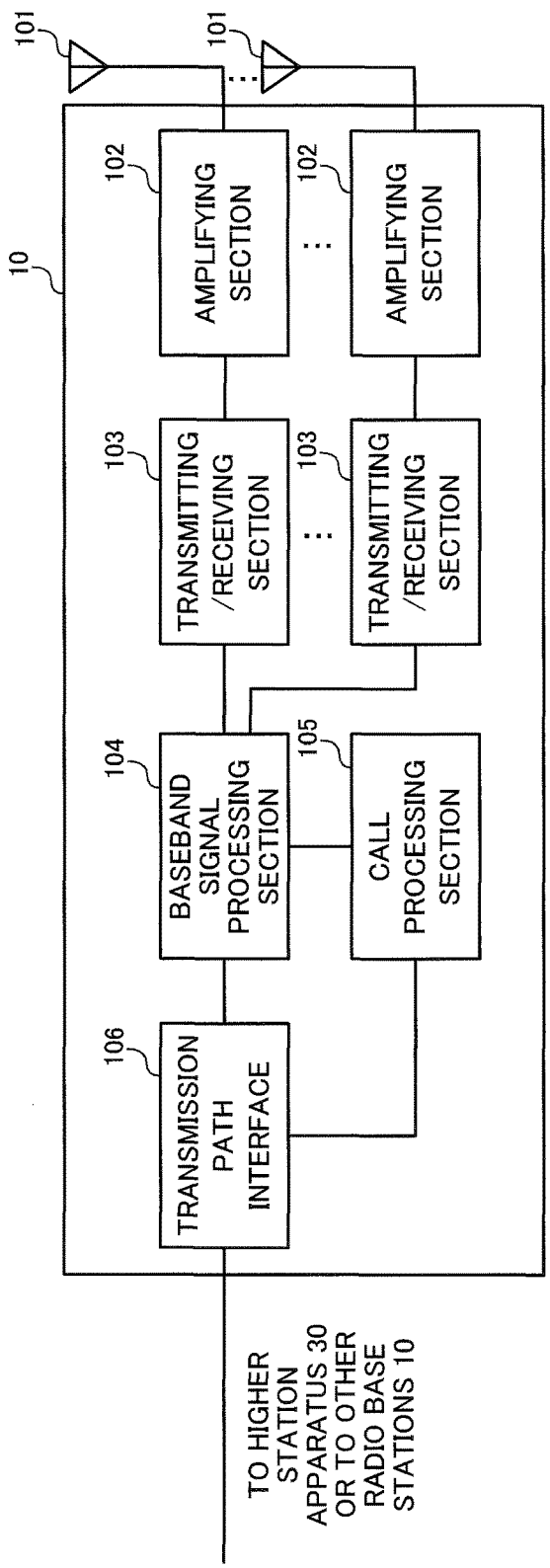
FIG. 16 is a diagram to explain an overall structure of a radio base station according to the present embodiment.

FIG. 16 is a diagram to show an overall structure of a radio base station 10 (which covers the radio base stations 11 and 12) according to the present embodiment. The radio base station 10 has a plurality of transmitting/receiving antennas 101 for MIMO transmission, amplifying sections 102, transmitting/receiving sections 103, a baseband signal processing section 104, a call processing section 105 and a transmission path interface 106.

User data to be transmitted from the radio base station 10 to a user terminal 20 on the downlink is input from the higher station apparatus 30, into the baseband signal processing section 104, via the transmission path interface 106.

In the baseband signal processing section 104, a PDCP layer process, division and coupling of the user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a pre-coding process are performed, and the result is transferred to each transmitting/receiving section 103. Furthermore, downlink control channel signals are also subjected to transmission processes such as channel coding and an inverse fast Fourier transform, and are transferred to each transmitting/receiving section 103.

Also, the baseband signal processing section 104 reports, to the user terminal 20, control information for allowing communication in the cell, through higher layer signaling (RRC signaling, broadcast channel and so on). The information for allowing communication in the cell includes, for example, the uplink or downlink system bandwidth, feedback resource information, and so on. Each transmitting/receiving section 103 converts the baseband signals, which are pre-coded and output from the baseband signal processing section 104 on a per antenna basis, into a radio frequency band. The amplifying sections 102 amplify the radio frequency signals having been subjected to frequency conversion, and transmit the results through the transmitting/receiving antennas 101.

On the other hand, as for data that is transmitted from the user terminal 20 to the radio base station 10 on the uplink, radio frequency signals that are received in the transmitting/receiving antennas 101 are each amplified in the amplifying sections 102, converted into baseband signals through frequency conversion in each transmitting/receiving section 103, and input into the baseband signal processing section 104.

In the baseband signal processing section 104, the user data that is included in the input baseband signals is subjected to an FFT process, an IDFT process, error correction decoding, a MAC retransmission control receiving process and RLC layer and PDCP layer receiving processes, and the result is transferred to the higher station apparatus 30 via the transmission path interface 106. The call processing section 105 performs call processing such as setting up and releasing communication channels, manages the state of the radio base station 10 and manages the radio resources.

Figure 17:
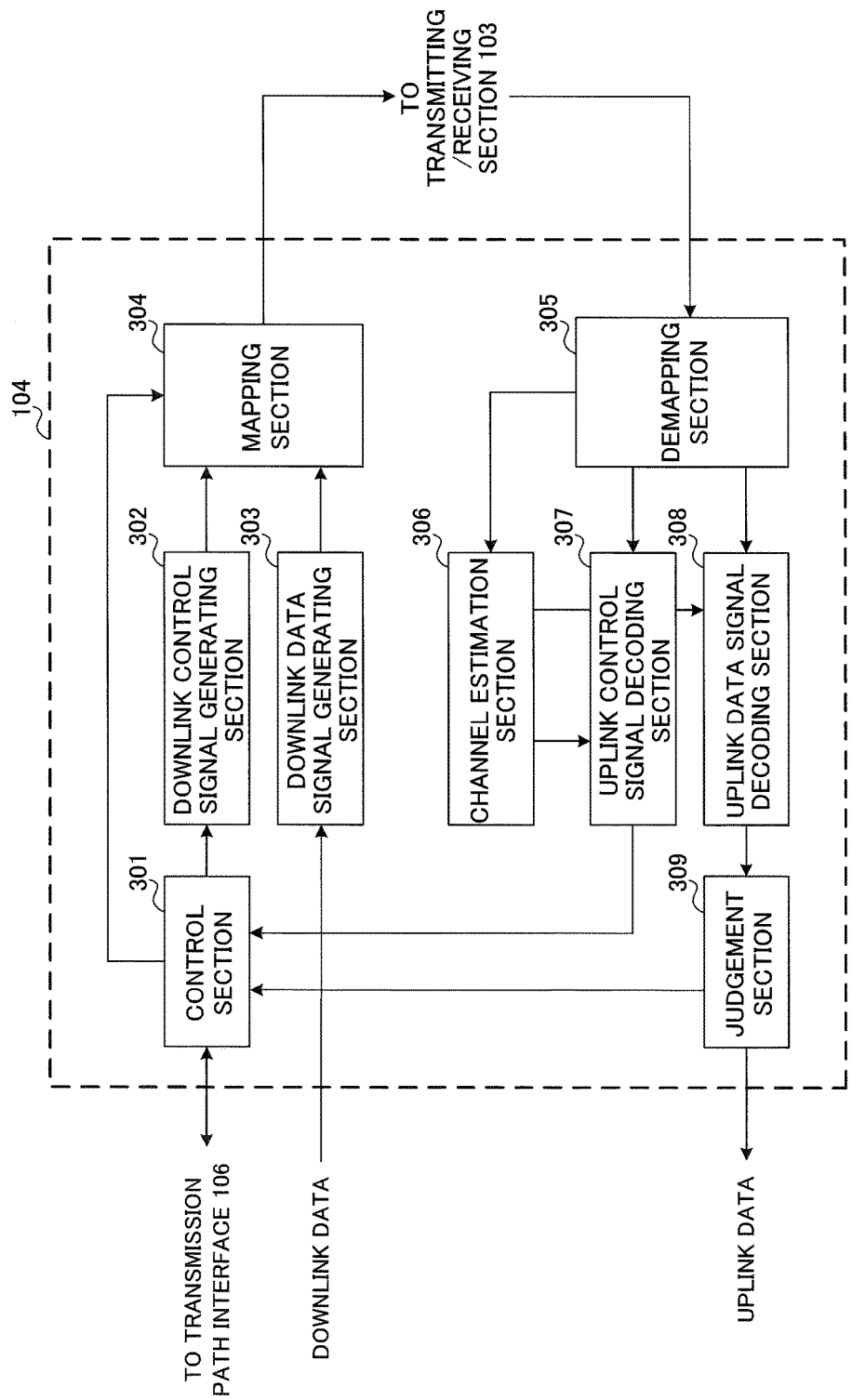
FIG. 17 is a diagram to explain a functional structure of a radio base station according to the present embodiment.

FIG. 17 is a diagram to show a principle functional structure of the baseband signal processing section 104 provided in a radio base station 10 according to the present embodiment. As shown in FIG. 17, the baseband signal processing section 104 provided in the radio base station 10 is comprised at least of a control section 301, a downlink control signal generating section 302, a downlink data signal generating section 303, a mapping section 304, a demapping section 305, a channel estimation section 306, an uplink control signal decoding section 307, an uplink data signal decoding section 308 and a judgement section 309.

The control section 301 controls the scheduling of the downlink user data transmitted in the PDSCH, the downlink control information transmitted in the PDCCH and/or the enhanced PDCCH (EPDCCH), and the downlink reference signals. Also, the control section 301 controls the scheduling (assignment control) of the uplink data transmitted in the PUSCH, the uplink control information transmitted in the PUCCH or the PUSCH, and the uplink reference signals. Information about the assignment control of the uplink signals (uplink control signal, uplink user data) is reported to the user terminal by using downlink control signals (DCI).

To be more specific, the control section 301 controls the assignment of radio resources to the downlink signals and uplink signals based on command information from the higher station apparatus 30 and feedback information from each user terminal 20. That is, the control section 301 functions as a scheduler. Also, when the user terminal employs the feedback method of the present embodiment described earlier, the control section 301 determines the PUSCH resource to assign the feedback signals in response to the SCell (small cell) to.

The information related to the PUSCH resource, determined in the control section 301, may be included in the downlink control signals generated in the downlink signal generating section 302, or may be included as higher layer signaling in the downlink data signals generated in the downlink data signal generating section 303. For example, information regarding the assignment of the PUSCH resource is defined with the ARI and ARO bits in downlink control information (DL assignment) and reported to the user terminal.

The downlink control signal generating section 302 generates downlink control signals (the PDCCH signal and/or the EPDCCH signal), the assignment of which is determined by the control section 301. To be more specific, based on commands from the control section 301, the downlink control signal generating section 302 generates a downlink assignment, which reports downlink signal assignment information, and a UL grant, which reports uplink signal assignment information.

The downlink data signal generating section 303 generates downlink data signals (PDSCH signal), the assignment of which to resources is determined by the control section 301. The data signals that are generated in the data signal generating section 303 are subjected to a coding process and a modulation process, based on coding rates and modulation schemes that are determined based on CSI from each user terminal 20 and so on.

The mapping section 304 controls the assignment of the downlink control signals generated in the downlink control signal generating section 302 and the downlink data signals generated in the downlink data signal generating section 303 to radio resources, based on commands from the control section 301.

The demapping section 305 demaps the uplink signals transmitted from the user terminals and separates the uplink signals. The channel estimation section 306 estimates channel states from the reference signals included in the received signals separated in the demapping section 305, and outputs the estimated channel states to the uplink control signal decoding section 307 and the uplink data signal decoding section 308.

The uplink control signal decoding section 307 decodes the feedback signals (delivery acknowledgement signal and so on) transmitted in the uplink control channel (PUCCH), and outputs the result to the control section 301. The uplink data signal decoding section 308 decodes the uplink data signal transmitted in the uplink shared channel (PDSCH), and outputs the result to the judgement section 309. The judgement section 309 makes a retransmission control judgement (ACK/NACK) based on the decoding result in the uplink data signal decoding section 308, and outputs result to the control section 301.

Figure 18:
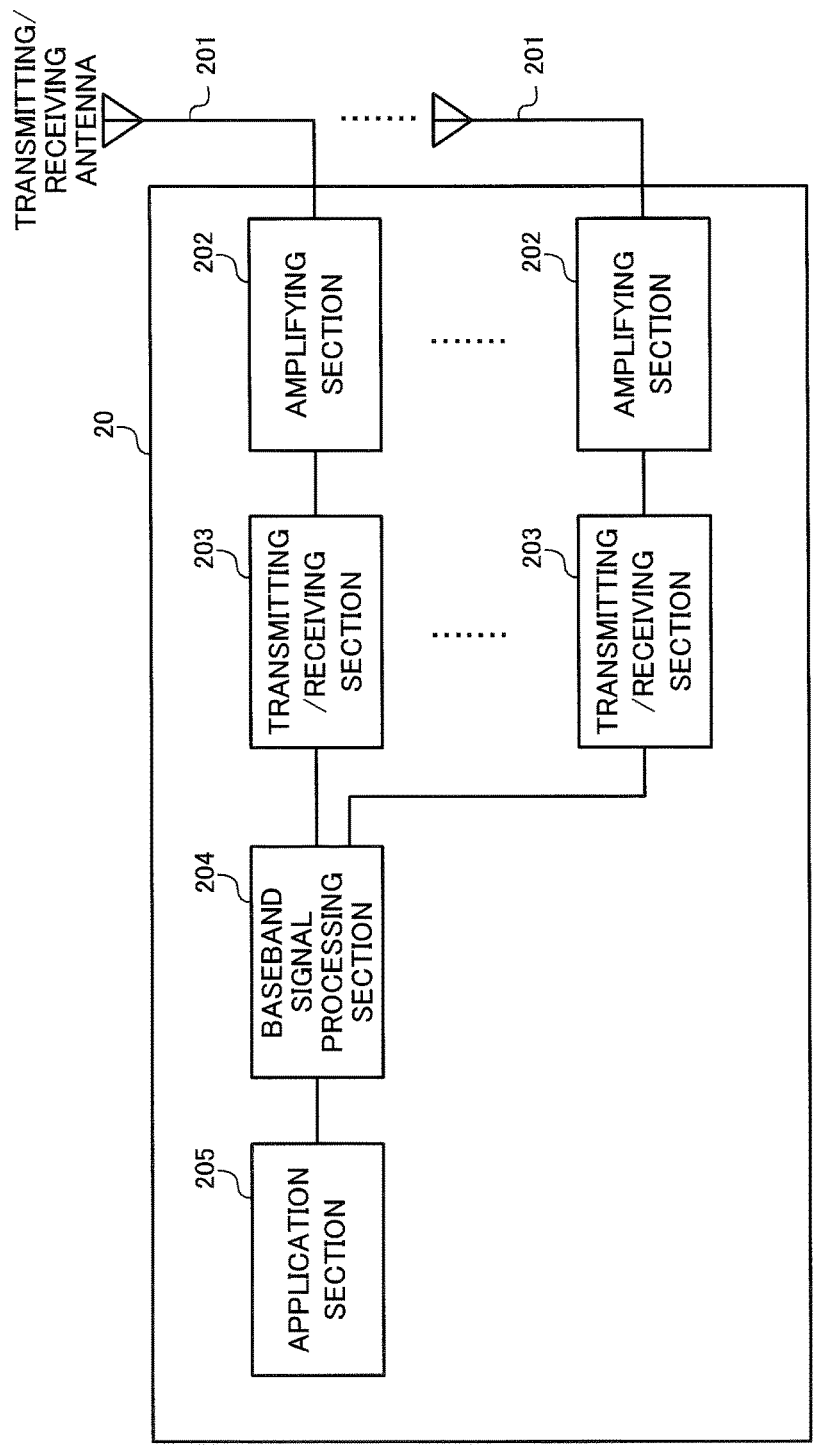
FIG. 18 is a diagram to explain an overall structure of a user terminal according to the present embodiment.

FIG. 18 is a diagram to show an overall structure of a user terminal 20 according to the present embodiment. The user terminal 20 has a plurality of transmitting/receiving antennas 201 for MIMO transmission, amplifying sections 202, transmitting/receiving sections (receiving sections) 203, a baseband signal processing section 204 and an application section 205.

As for downlink data, radio frequency signals that are received in a plurality of transmitting/receiving antennas 201 are each amplified in the amplifying sections 202, and subjected to frequency conversion and converted into baseband signals in the transmitting/receiving section 203. These baseband signals are subjected to an FFT process, error correction decoding, a retransmission control receiving process and so on, in the baseband signal processing section 204. In this downlink data, downlink user data is transferred to the application section 205. The application section 205 performs processes related to higher layers above the physical layer and the MAC layer, and so on. Also, in the downlink data, broadcast information is also transferred to the application section 205.

Meanwhile, uplink user data is input from the application section 205 into the baseband signal processing section 204. The baseband signal processing section 204 performs a retransmission control (HARQ (Hybrid ARQ)) transmission process, channel coding, pre-coding, a DFT process, an IFFT process and so on, and transfers the result to each transmitting/receiving section. The baseband signals that are output from the baseband signal processing section 204 are converted into a radio frequency band in the transmitting/receiving sections 203. After that, the amplifying sections 202 amplify the radio frequency signals having been subjected to frequency conversion, and transmit the results from the transmitting/receiving antennas 201.

Figure 19:
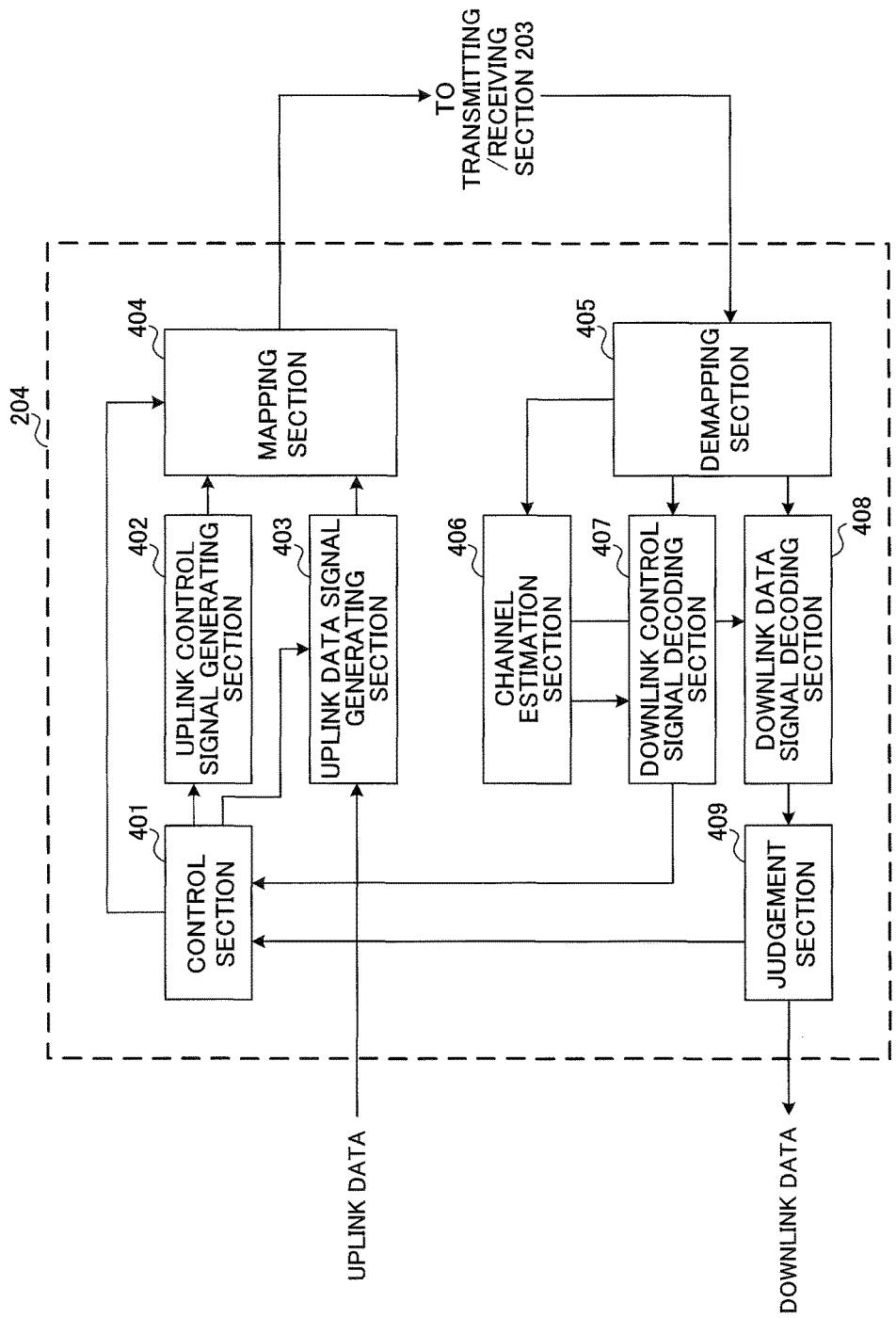
FIG. 19 is a diagram to explain a functional structure of a user terminal according to the present embodiment.

FIG. 19 is a diagram to show a principle functional structure of the baseband signal processing section 204 provided in the user terminal 20. As shown in FIG. 19, the baseband signal processing section 204 provided in the user terminal 20 is comprised at least of a control section 401, an uplink control signal generating section 402, an uplink data signal generating section 403, a mapping section 404 (assignment section), a demapping section 405, a channel estimation section 406, a downlink control signal decoding section 407, a downlink data signal decoding section 408 and a judgement section 409.

The control section 401 controls the generation of uplink control signals (feedback signals) and uplink data signals, based on the downlink control signals (uplink grant, downlink assignment) and the retransmission control judgement result transmitted from the radio base station 10. The downlink control signals are output from the downlink control signal decoding section 408, and the retransmission control judgment result is output from the judgement section 410.

Also, based on the downlink control signals (uplink grant, downlink assignment) transmitted from the radio base station 10, the control section 401 commands the mapping section 404 as to the assignment of uplink control signals (feedback signals) and uplink data signals to radio resources.

The uplink control signal generating section 402 generates uplink control signals (feedback signals such as delivery acknowledgement signals, channel state information (CSI) and so on) based on commands from the control section 401. Also, the uplink data signal generating section 403 generates uplink data signals based on commands from the control section 401. Note that the control section 401 commands the uplink data signal 403 to generate an uplink data signal when an uplink grant is contained in a downlink control signal reported from the radio base station 10.

The mapping section 404 (assignment section) controls the assignment of the uplink control signals (feedback signals) and the uplink data signals to radio resources based on commands from the control section 401. For example, the mapping section 404 assigns the feedback signals to the channel of the proposed example shown in above FIG. 11 and FIG. 12 depending on the CC (cell) to which the feedback is desired to be sent.

For example, when the user terminal employs the feedback method of the present embodiment, the mapping section 404 assigns feedback signals in response to a downlink signal from the radio base station 11 (macro base station) to the PUCCH or the PUSCH on the PCell. To be more specific, when a UL grant is detected from a downlink signal from the macro base station, the mapping section 404 assigns the feedback signals to the PUSCH resource of the PCell assigned by the UL grant (see above FIG. 8B). Otherwise, the mapping section 404 assigns the feedback signals to the PUCCH resource of the PCell (see above FIGS. 8A and 8C).

Also, the mapping section 404 assigns feedback signals in response to downlink signals from the radio base station 12 (small base station) to the PUSCH, regardless of whether or not there is a UL grant. To be more specific, when no UL grant is detected from a downlink signal from the small base station, the mapping section 404 assigns the feedback signals to the PUSCH resource reported from higher layer and/or the DL assignment (see above FIG. 8B). Also, when a UL grant is detected, the mapping section 404 assigns the feedback signals to the PUSCH resource assigned by the UL grant (see above FIG. 8C). In this way, the mapping section 404 of the user terminal 20 assigns feedback signals for the SCell to the PUSCH regardless of whether or not there is a UL grant.

The demapping section 405 demaps the downlink signals transmitted from the radio base station 10 and separates the downlink signals. The channel estimation section 406 estimates channel states from the reference signals included in the received signals separated in the demapping section 405, and outputs the estimated channel states to the downlink control signal decoding section 407 and the downlink data signal decoding section 408.

The downlink control signal decoding section 407 decodes the downlink control signals (uplink grant, downlink assignment) transmitted in the downlink control channel (PDCCH), and outputs the scheduling information (information regarding the assignment to uplink resources) to the control section 401. The downlink data signal decoding section 408 decodes the downlink data signals transmitted in the downlink shared channel (PDSCH), and outputs the result to the judgement section 410. The judgement section 409 makes a retransmission control judgement (ACK/NACK) based on the decoding result in the downlink data signal decoding section 409, and outputs the result to the control section 401.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of the claims. For example, a plurality of examples described above may be combined and implemented as appropriate. Consequently, the descriptions herein are provided only for the purpose of explaining examples, and should by no means be construed to limit the present invention in any way.

The disclosure of Japanese Patent Application No. 2013-099280, filed on May 9, 2013, including the specification, drawings and abstract, is incorporated herein by reference in its entirety.

The invention claimed is:

1. A user terminal comprising:
a receiving section that receives downlink signals in a first cell and a second cell; and
a transmission section that transmits a feedback signal for a downlink data signal, wherein
the receiving section receives, from the first cell, a first control information to communicate in the second cell by higher layer signaling, the receiving section receives, from the second cell, a second control information comprising downlink control information to instruct reception of the downlink data signal, the transmission section transmits, to the second cell, using a channel designated by a resource in accordance with the downlink control information, the feedback signal for the downlink data signal received based on the first control information, the transmission section selects a resource corresponding to a resource block (RB) number of any one of a plurality of resource candidates, to which RB numbers have been configured by higher layer signaling, for the second cell as a selected channel resource for the channel based on the downlink control information, and the transmission section is configured to control transmission power using a transmission power control parameter that is different from a transmission power control parameter used when the feedback signal is transmitted based on a control signal for instructing uplink data transmission on an uplink shared channel, and transmit a feedback signal for the downlink data signal using the selected channel resource.

2. The user terminal according to claim 1, wherein the transmission section selects, from the plurality of resource candidates for the second cell, a resource indicated by ARI (ACK/NACK Resource Indicator) or ARO (ACK/NACK Resource Offset) contained in the downlink control information, as the selected channel resource.

3. The user terminal according to claim 1, wherein, when transmitting the feedback signal for the downlink data signal using the selected channel resource, the transmission section performs RB hopping between slots.

4. The user terminal according to claim 1, wherein, when transmitting the feedback signal for the downlink data signal using the selected channel resource, the transmission section includes and transmits channel state information (CSI).

5. The user terminal according to claim 1, wherein
the receiving section receives information to instruct application of a specific feedback method by higher layer signaling, and
the transmission section transmits the feedback signal for the downlink data signal using the selected channel resource on the basis of the information to instruct application of the specific feedback method.

6. The user terminal according to claim 1, wherein the first cell is a primary cell and the second cell is a secondary cell.

7. The user terminal according to claim 1, wherein a first radio base station forming the first cell and a second radio base station forming the second cell carry out scheduling independently.

8. The user terminal according to claim 1, wherein the transmission section is configured to transmit the feedback signal for the downlink data signal using the selected channel resource when not transmitting the feedback signal using the resource indicated by the control signal for instructing uplink data transmission on an uplink shared channel.

9. A radio communication method comprising:
receiving downlink signals in a first cell and a second cell and;
transmitting a feedback signal for a downlink data signal, wherein in the receiving step, a first control information to communicate in the second cell is received from the first cell by higher layer signaling, in the receiving step, a second control information comprising downlink control information to instruct reception of the downlink data signal is received from the second cell, in the transmitting step, the feedback signal for the downlink data signal received based on the first control information is transmitted to the second cell using a channel designated by a resource in accordance with the downlink control information, in the transmitting step, a resource corresponding to an Resource Blocks RB number of any one of a plurality of resource candidates, to which RB numbers have been configured by higher layer signaling, is selected for the second cell as a selected channel resource for the channel based on the downlink control information, and in the transmitting step, controlling transmission power using a transmission power control parameter that is different from a transmission power control parameter used when the feedback signal is transmitted based on a control signal for instructing uplink data transmission on an uplink shared channel, and transmitting a feedback signal for the downlink data signal using the selected channel resource.

10. The radio communication method according to claim 9, wherein in the transmitting step, transmitting the feedback signal for the downlink data signal using the selected channel resource when not transmitting the feedback signal using the resource indicated by the control signal for instructing uplink data transmission on an uplink shared channel.

11. A user terminal comprising:
a receiving section that receives downlink signals in a first cell and a second cell; and
a transmission section that transmits a feedback signal for a downlink data signal, wherein
the receiving section receives, from the first cell, a first control information to communicate in the second cell by higher layer signaling,
the receiving section receives, from the second cell, a second control information comprising downlink control information to instruct reception of the downlink data signal,
the transmission section transmits, to the second cell, using a channel designated by a resource in accordance with the downlink control information, the feedback signal for the downlink data signal received based on the first control information,
the transmission section selects a resource corresponding to a resource block (RB) number of any one of a plurality of resource candidates, to which RB numbers have been configured by higher layer signaling, for the second cell as a selected channel resource for the channel based on the downlink control information, and
the transmission section is configured to transmit the feedback signal for the downlink data signal using the selected channel resource when not transmitting the feedback signal using the resource indicated by the control signal for instructing uplink data transmission on an uplink shared channel.

* * * * *